US011262930B2

(12) United States Patent
Fan et al.

(10) Patent No.: US 11,262,930 B2
(45) Date of Patent: Mar. 1, 2022

(54) METHOD, APPARATUS, AND STORAGE MEDIUM FOR MANAGING STRIPE IN STORAGE SYSTEM

(71) Applicant: EMC IP Holding Company LLC, Hopkinton, MA (US)

(72) Inventors: Huijuan Fan, Chengdu (CN); Chi Chen, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 21 days.

(21) Appl. No.: 16/996,115

(22) Filed: Aug. 18, 2020

(65) Prior Publication Data

US 2021/0318825 A1    Oct. 14, 2021

(30) Foreign Application Priority Data

Apr. 14, 2020    (CN) .......................... 202010292378.9

(51) Int. Cl.
*G06F 3/06*    (2006.01)

(52) U.S. Cl.
CPC .......... *G06F 3/0644* (2013.01); *G06F 3/0619* (2013.01); *G06F 3/0647* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 10,146,624 | B1* | 12/2018 | Gong | .................... G06F 11/142 |
| 2018/0088857 | A1* | 3/2018 | Gao | .................... G06F 11/2094 |
| 2019/0004728 | A1* | 1/2019 | Zhuo | .................... G06F 3/0635 |
| 2019/0196738 | A1* | 6/2019 | Xu | .................... G06F 17/11 |
| 2019/0220231 | A1* | 7/2019 | Xu | .................... G06F 3/0647 |
| 2019/0339897 | A1* | 11/2019 | Ash | .................... G06F 3/067 |
| 2020/0026468 | A1* | 1/2020 | Kang | .................... G06F 3/0665 |
| 2020/0133848 | A1* | 4/2020 | Xu | .................... G06F 3/0608 |
| 2020/0133852 | A1* | 4/2020 | Lv | .................... G06F 12/0646 |

* cited by examiner

*Primary Examiner* — Kaushikkumar M Patel
(74) *Attorney, Agent, or Firm* — BainwoodHuang

(57) ABSTRACT

Techniques manage stripes in a storage system. A balance index of a storage device in the storage system is determined respectively, the balance index indicating a relationship between distribution of a set of stripes involved by the storage device and distribution of a set of stripes involved by storage devices in the storage system. A source storage device is selected from the storage devices according to the determined balance indexes. A source extent is selected from a set of extents that have been allocated in the source storage device. Data in the source extent is moved to an idle extent in a destination storage device in the storage devices. The extents in the stripes may be distributed as evenly as possible in the storage devices, thereby ensuring load balance of the storage system and managing the stripes in the storage system in a more effective manner.

20 Claims, 10 Drawing Sheets

METHOD, APPARATUS, AND STORAGE MEDIUM FOR MANAGING STRIPE IN STORAGE SYSTEM

CROSS-REFERENCE TO RELATED APPLICATION

This application claims priority to Chinese Patent Application No. CN202010292378.9, on file at the China National Intellectual Property Administration (CNIPA), having a filing date of Apr. 14, 2020, and having "METHOD, APPARATUS, AND STORAGE MEDIUM FOR MANAGING STRIPE IN STORAGE SYSTEM" as a title, the contents and teachings of which are herein incorporated by reference in their entirety.

TECHNICAL FIELD

Implementations of the present disclosure relate to storage management, and more particularly, to a method, a device, and a computer program product for managing stripes in a storage system.

BACKGROUND

With the development of data storage technologies, various data storage devices have been able to provide users with increasingly high data storage capabilities, and the speed of data access has also been greatly improved. While data storage capabilities are improved, users also have increasingly high demands for data reliability and the response time of storage systems. At present, various data storage systems based on Redundant Array of Independent Disks (RAIDs) have been developed to improve data reliability. When one or more disks in a storage system fail, data in the failed disks can be reconstructed from data on other normally operating disks.

A mapped RAID has been developed at present. In this mapped RAID, disk is a logical concept and can include a plurality of extents. A plurality of extents included in a logical disk can be distributed on different physical storage devices in a resource pool. For a plurality of extents in one stripe of the mapped RAID, the plurality of extents should be distributed on different physical storage devices. This makes it possible to perform, when a physical storage device where one of the plurality of extents is located fails, a reconstruction operation to recover data from physical storage devices where other extents are located. During the operation of a storage system, how to manage all stripes in the storage system so that all the stripes are evenly distributed in the storage system becomes a technical problem.

SUMMARY OF THE INVENTION

Therefore, it is desirable to develop and implement a technical solution for managing stripes in a storage system in a more effective manner. It is expected that the technical solution can be compatible with existing storage systems, and can manage the stripes in the storage system in a more effective manner by modifying various configurations of the existing storage systems.

According to a first aspect of the present disclosure, a method for managing stripes in a storage system is provided, the storage system including a plurality of storage devices. In the method, a balance index of a storage device in the plurality of storage devices is determined respectively, the balance index indicating a relationship between distribution of a set of stripes involved by the storage device and distribution of a set of stripes involved by the plurality of storage devices. A source storage device is selected from the plurality of storage devices according to the determined balance indexes. A source extent is selected from a set of extents that have been allocated in the source storage device. Data in the source extent is moved to an idle extent in a destination storage device in the plurality of storage devices.

According to a second aspect of the present disclosure, an electronic device is provided, including: at least one processor; and a memory coupled to the at least one processor and having instructions stored therein, wherein the instructions, when executed by the at least one processor, cause the device to perform the method according to the first aspect of the present disclosure.

According to a third aspect of the present disclosure, a computer program product is provided. The computer program product is tangibly stored on a non-transitory computer-readable medium and includes machine-executable instructions, the machine-executable instructions being used for performing the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example but not limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although the preferred implementations of the present disclosure are shown in the accompanying drawings, it should be understood that the present disclosure can be implemented in various forms and should not be limited by the implementations set forth herein. But rather, these implementations are provided so that the present disclosure will be more thorough and complete, and the scope of the present disclosure can be fully conveyed to those skilled in the art.

As used herein, the term "comprising" and variations thereof mean open inclusion, i.e., "comprising, but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," and the like may refer to different or the same objects. Other explicit and implicit definitions may also be included below.

In the context of the present disclosure, a storage system may be an RAID-based storage system. The RAID-based storage system may combine a plurality of storage devices into a disk array. By providing redundant storage devices, the reliability of the entire disk group may greatly exceed that of a single storage device. RAID may provide various advantages over a single storage device, such as enhanced data integration, enhanced fault tolerance, increased throughput or capacity, and so on. There are a plurality of standards for RAID, such as RAID-1, RAID-2, RAID-3, RAID-4, RAID-5, RAID-6, RAID-10, RAID-50, and so on.

Figure 1A:
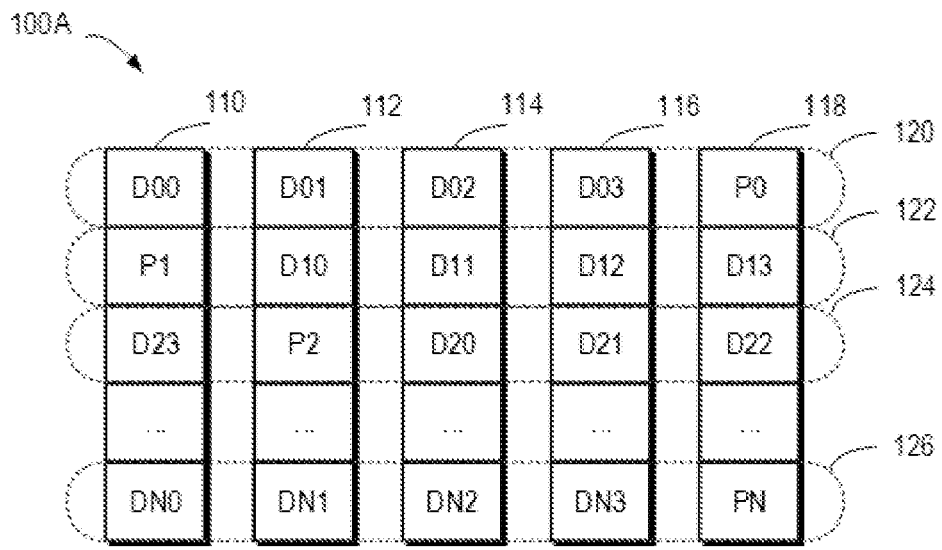
FIGS. 1A and 1B respectively schematically show block diagrams of a storage system in which implementations of the present disclosure may be implemented.

FIG. 1A schematically shows a schematic diagram of storage system 100A in which a method of the present disclosure may be implemented. In the storage system shown in FIG. 1A, RAID-5 array (4D+1P, where 4D indicates that the storage system includes four storage devices for storing data, and 1P indicates that the storage system includes one storage device for storing a P-parity) including five independent storage devices (110, 112, 114, 116, and 118) is used as an example to illustrate the working principle of RAID. It should be noted that although five storage devices are schematically shown in FIG. 1A, more or fewer storage devices may be included in other implementations depending on different RAID levels. Although stripes 120, 122, 124, . . . , 126 are shown in FIG. 1A, in other examples, an RAID system may also include different numbers of stripes.

In the RAID, a stripe may span a plurality of physical storage devices (e.g., stripe 120 spans storage devices 110, 112, 114, 116, and 118). A stripe may be simply understood as a storage area that satisfies a certain address range among the plurality of storage devices. Data stored in stripe 120 includes a plurality of parts: data block D00 stored on storage device 110, data block D01 stored on storage device 112, data block D02 stored on storage device 114, data block D03 stored on storage device 116, and data block P0 stored on storage device 118. In this example, data blocks D00, D01, D02, and D03 are stored data, and data block P0 is a P-parity of the stored data.

The manner in which data is stored in other stripes 122 and 124 is also similar to that of stripe 120, except that parities related to other data blocks may be stored on a storage device different from storage device 118. In this way, when one of storage devices 110, 112, 114, 116, and 118 fails, data in the failed device may be recovered from other normal storage devices.

Figure 1B:
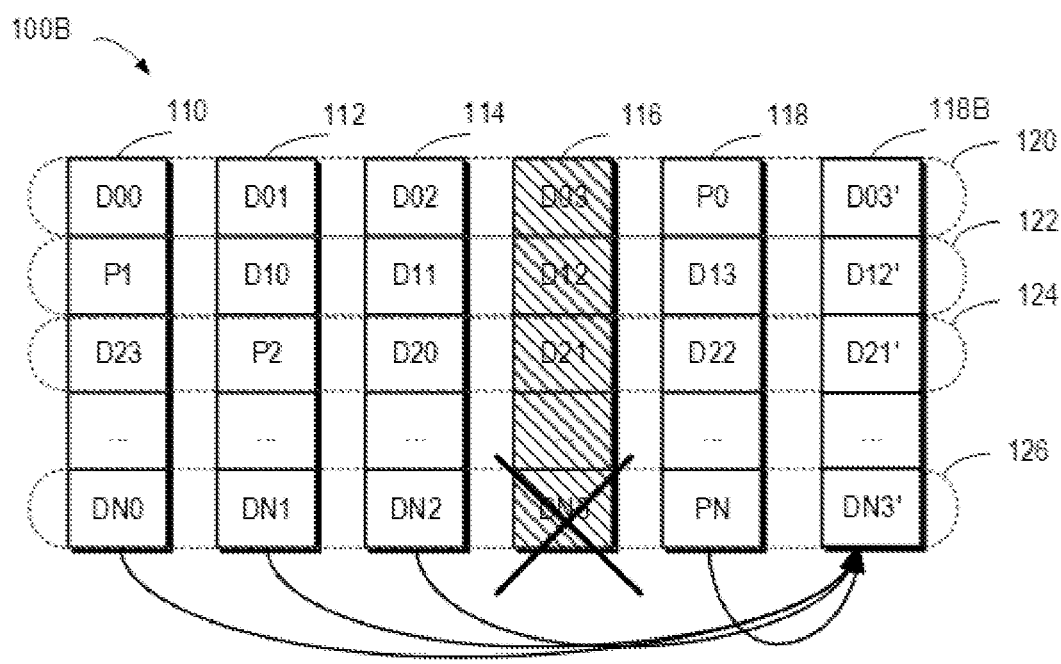

FIG. 1B schematically shows schematic diagram 100B of a reconstruction process of storage system 110A. As shown in FIG. 1B, when one storage device (for example, storage device 116 shown by shadow) fails, data may be recovered from remaining multiple storage devices 110, 112, 114, and 118 that operate normally. In this case, new backup storage device 118B may be added into the RAID to replace storage device 118. In this way, the recovered data may be written to 118B and the system may be reconstructed.

It should be noted that although a RAID-5 storage system including five storage devices (four storage devices for storing data and one storage device for storing a parity) is described above with reference to FIGS. 1A and 1B, according to definitions of other RAID levels, there may also be storage systems that include other numbers of storage devices. For example, based on the definition of RAID-6, two storage devices may be used to store parities P and Q respectively. For another example, based on the definition of a triple parity RAID, three storage devices may be used to store parities P, Q, and R respectively.

Figure 2:
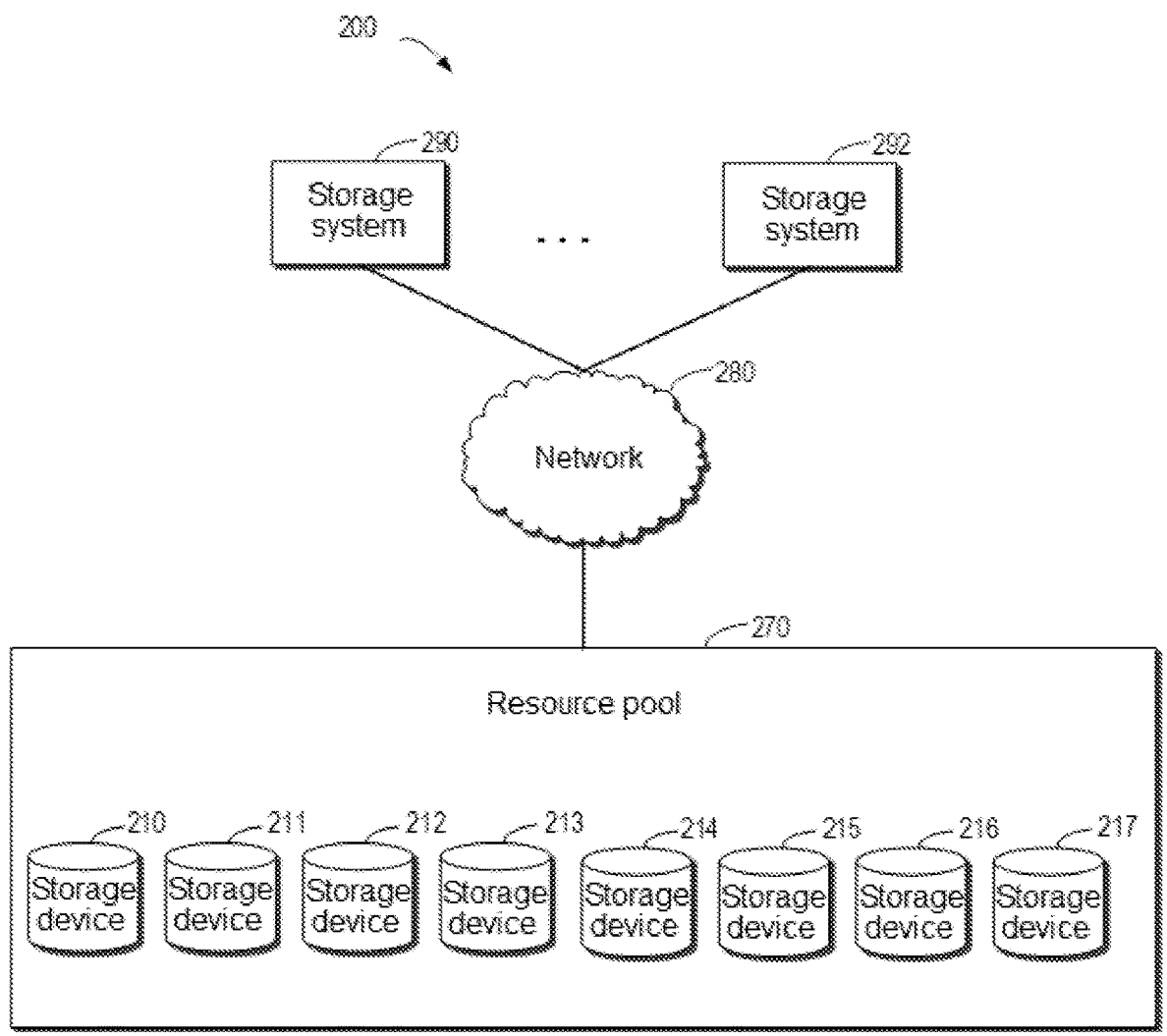
FIG. 2 schematically shows a block diagram of an example environment in which implementations of the present disclosure may be implemented.

With the development of distributed storage technologies, all storage devices 110, 112, 114, 116, and 118 in the storage system shown in FIGS. 1A and 1B may no longer be limited to physical storage devices, but may be virtual storage devices. For example, all extents on storage device 110 may respectively come from different physical storage devices (hereinafter simply referred to as storage devices) in a resource pool. FIG. 2 schematically shows a block diagram of an example environment in which a method of the present disclosure may be implemented. As shown in FIG. 2, storage resource pool 270 may include a plurality of physical storage devices 210, 211, 212, 213, 214, 215, 216, and 217. In this case, storage spaces in the plurality of storage devices may be allocated to multiple storage systems 290, . . . , 292 of users. In this case, storage systems 290, . . . , 292 of users may access the storage spaces in all the storage devices in storage resource pool 270 via network 280. It will be understood that although FIG. 2 only schematically shows the case where storage resource pool 270 includes eight storage devices, according to an example implementation of the present disclosure, storage resource pool 270 may also include more or fewer storage devices.

Figure 3:
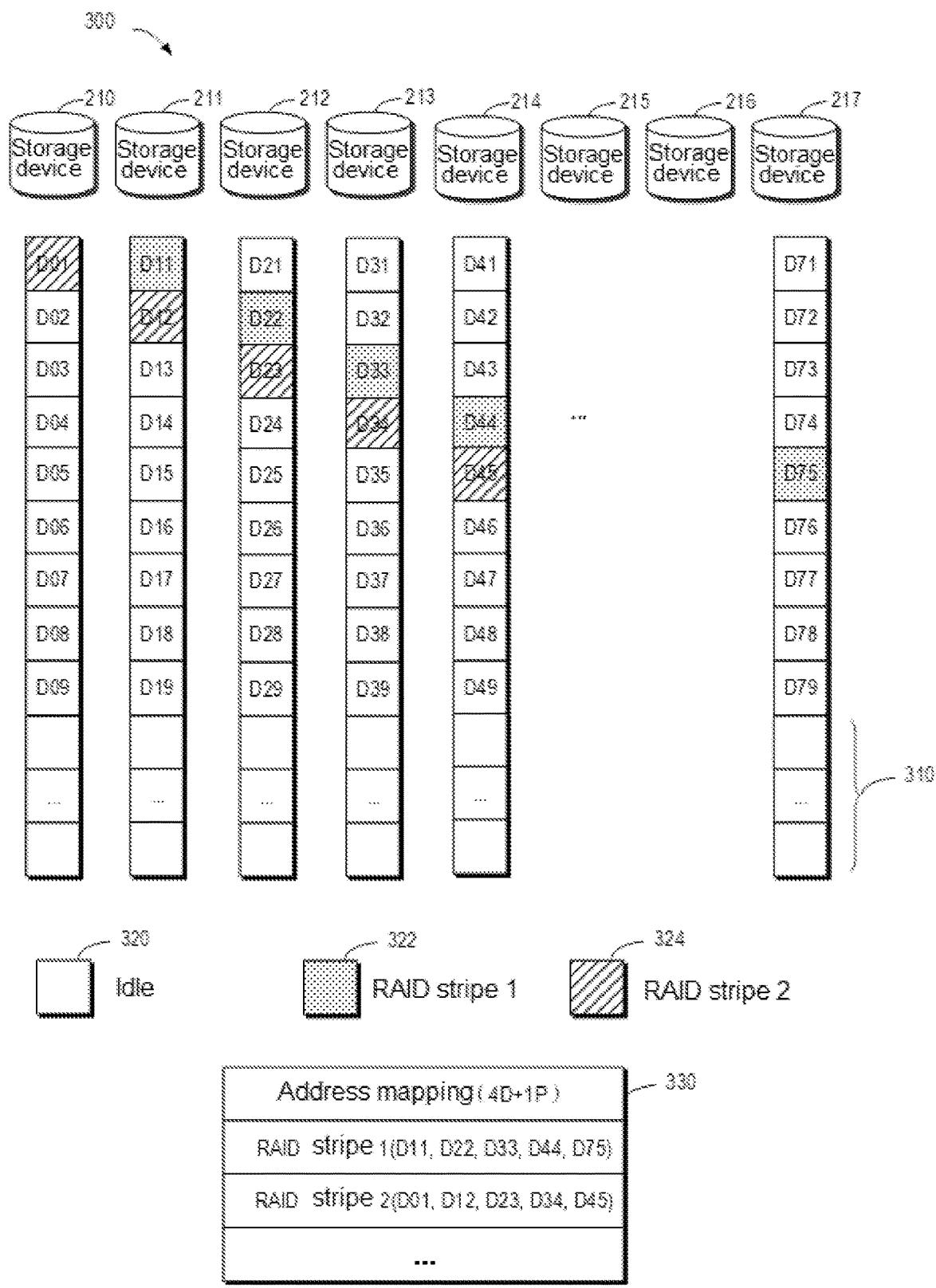
FIG. 3 schematically shows a diagram of a storage resource pool in FIG. 2.

FIG. 3 schematically shows a diagram of more information of storage resource pool 270 shown in FIG. 2. Resource pool 270 may include a plurality of storage devices 210 to 217. Each storage device may include a plurality of extents, where legend 320 indicates an idle extent, legend 322 indicates an extent for RAID stripe 1, and legend 324 indicates an extent for RAID stripe 2. In this case, extents D11, D22, D33, and D44 for RAID stripe 1 are used to store data blocks of the stripe respectively, and extent D75 is used to store a parity of data. Extents D01, D12, D23, and D34 for RAID stripe 2 are used to store data blocks of the stripe respectively, and extent D45 is used to store a parity of data. As shown in FIG. 3, address mapping 330 shows an association relationship between stripes and addresses of extents in the stripes. For example, RAID stripe 1 may include five extents: D11, D22, D33, D44, and D75, and these five extents are located in storage devices 211, 212, 213, 214, and 217, respectively. Specifically, as shown in FIG. 3, extent D11 is the first extent in storage device 211, and extent D22 is the second extent in storage device 212. As shown in FIG. 3, there may also be reserved idle part 310 in each storage device, so that when one storage device in the resource pool fails, extents in idle part 310 in each storage device may be selected to reconstruct all extents in the failed storage device.

It should be noted that FIG. 3 only uses the 4D+1P RAID-5 storage system as an example to show how extents in each stripe are distributed in the plurality of storage systems in the resource pool. When another RAID level is adopted, those skilled in the art can implement specific details based on the above principles. For example, in a 6D+1P+1Q RAID-6 storage system, eight extents in each stripe may be distributed on a plurality of storage devices.

It will be understood that, with the operation of the storage system, use loads of the plurality of storage devices will be different, which will cause relatively high workloads of certain storage devices. Uneven workloads may cause use rates and read-and-write volumes of these storage devices to be much higher than those of other storage devices and then result in an access bottleneck. Further, it may cause the reconstruction time of these storage devices to be too long, and a higher risk of data loss may be faced. Currently, technical solutions for performing rebalance between a plurality of storage devices in a storage system based on use loads of the plurality of storage devices have been proposed. However, the performance of these technical solutions is not satisfactory, and there is no guarantee that extents in stripes are evenly distributed in the plurality of storage devices.

In order to overcome the above defects, the implementations of the present disclosure provide a method, a device, and a computer program product for managing stripes in a storage system. According to an example implementation of the present disclosure, the concept of a balance index of a storage device is proposed. The balance index indicates a relationship between distribution of a set of stripes involved by the storage device and distribution of a set of stripes involved by a plurality of storage devices. For convenience of description, in the following, more details of the example implementation of the present disclosure will be described using only a 4D+1P RAID stripe as an example of stripes.

The 4D+1P RAID stripe includes five extents, and data in the five extents is usually accessed in association. This results in an increase in access volume of five storage devices respectively including the five extents. In summary, for any two storage devices, the more stripes the two storage devices serve together, the greater the possibility that the two storage devices are accessed simultaneously, and the higher the workloads of the two storage devices. Therefore, two storage devices should be prevented from serving too many stripes at the same time.

Figure 4:
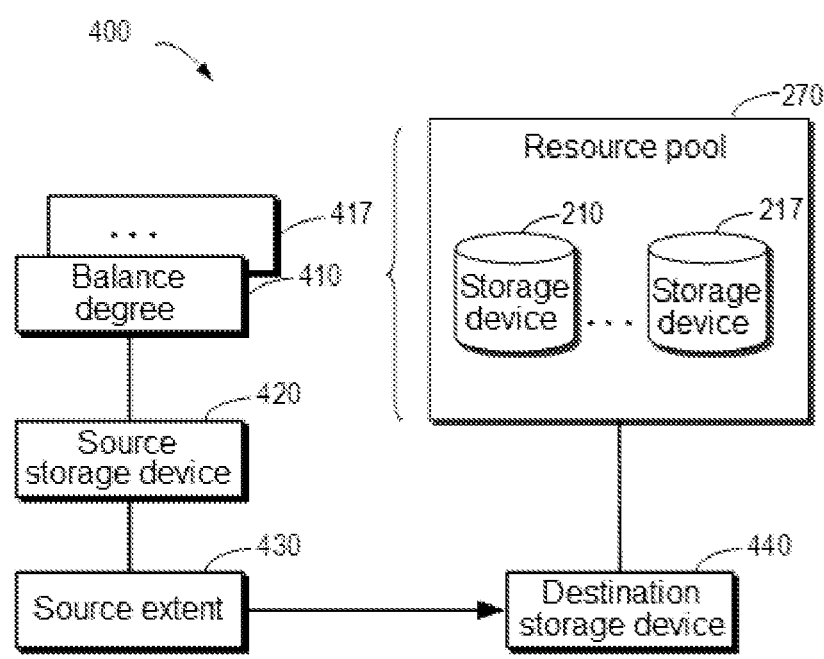
FIG. 4 schematically shows a block diagram of a process of managing stripes in a storage system according to one implementation of the present disclosure.

FIG. 4 schematically shows block diagram 400 of a process of managing stripes in a storage system according to one implementation of the present disclosure. As shown in FIG. 4, resource pool 270 of the storage system may include a plurality of storage devices 210 to 217. A balance index of each storage device in the plurality of storage devices may be determined respectively. It will be understood that the balance indexes and the storage devices may have a one-to-one correspondence. For example, distribution of a set of stripes involved by storage device 210 may be determined, overall distribution of all stripes involved by the plurality of storage devices may be determined, and balance index 410 of storage device 210 may be determined based on the distribution of the set of stripes and the overall distribution of all the stripes. Similarly, balance index 417 of storage device 217 may be determined, and balance indexes of all storage devices may be further determined.

In the case where the balance indexes of all storage devices have been determined, all the balance indexes may be compared to select source storage device 420 from a plurality of storage devices 210 to 217. Then, source extent 430 may be selected from source storage device 420. Here, source extent 430 indicates an extent to be moved. Further, destination storage device 440 may be selected from the plurality of storage devices, and data in source extent 430 is moved to an idle extent in destination storage device 440. With the example implementation of the present disclosure, a source storage device with the most unbalanced workload can be accurately selected from the plurality of storage devices. By moving data from the selected source storage device, the workload of the storage device may be reduced, thereby ensuring load balance among the plurality of storage devices. Hereinafter, more details of an example implementation of the present disclosure will be described with reference to FIG. 5.

Figure 5:
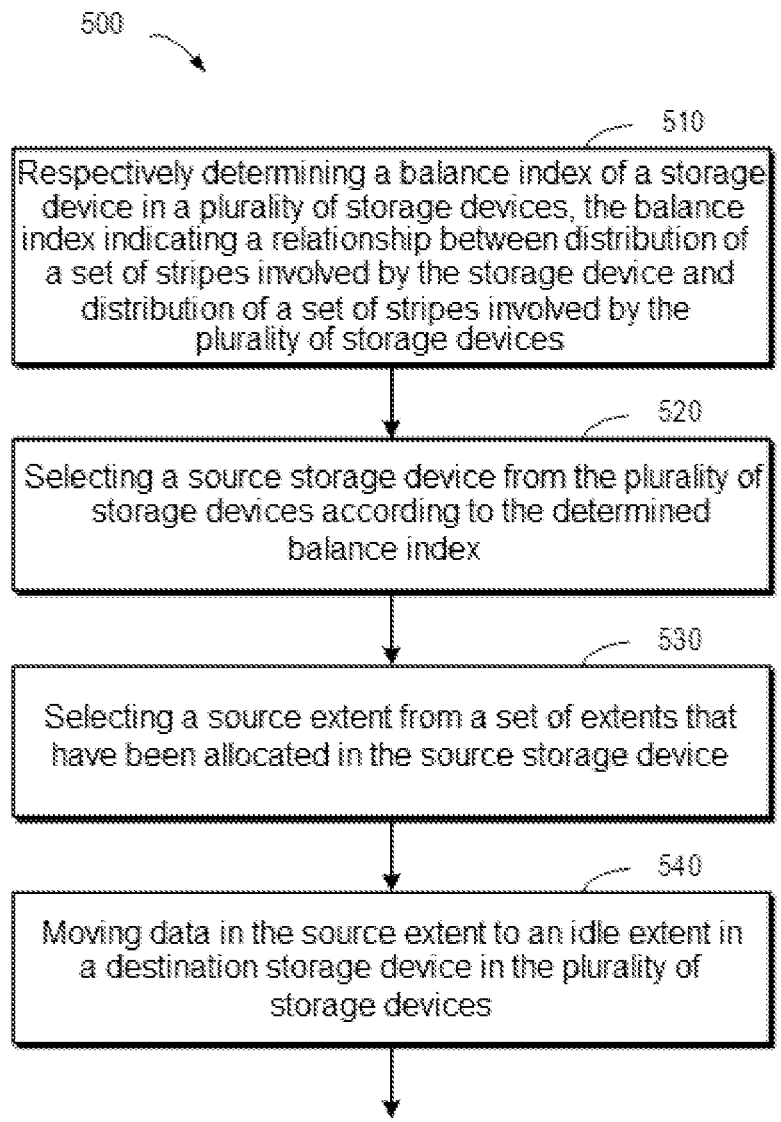
FIG. 5 schematically shows a block diagram of a method for managing stripes in a storage system according to one implementation of the present disclosure.

FIG. 5 schematically shows block diagram 500 of a method for managing stripes in a storage system according to one implementation of the present disclosure. At block 510, balance indexes of storage devices in a plurality of storage devices are determined respectively. Here, the balance index indicates a relationship between distribution of a set of stripes involved by a storage device and distribution of a set of stripes involved by the plurality of storage devices. According to an example implementation of the present disclosure, a balance index of each storage device may be determined. Specifically, a device correlation of the storage device may be determined first, where the device correlation indicates distribution of a set of stripes involved (that is, already created) in the storage system between the storage device and storage devices other than the storage device.

In the context of the present disclosure, M is used to indicate the number of storage devices in the storage system, and N is used to indicate the width of the stripes. Assuming that the storage system includes eight storage devices 210 to 217, then M=8. When a 4D+1P RAID is adopted, N=4+1=5.

In the following, the concept of a correlation between two storage devices is first introduced. For the ith storage device and the jth storage device (i≠j) in a plurality of storage devices, the correlation between the two storage devices can be expressed as $\gamma_{Disk\ i, Disk\ j}$. According to an example implementation of the present disclosure, the correlation of a storage device itself can be set as 0, that is, $\gamma_{Disk\ i, Disk\ i}=0$.

It will be understood that, at an initial stage of operation of the storage system, the storage system does not include any stripe, and in this case, five extents from any five storage devices may be selected to create a stripe. After the storage system runs for a period of time, the storage system may include a set of stripes that have been created. In this case, the number of stripes that simultaneously involve two specific storage devices in the set of stripes may be determined, and a correlation between the two specific storage devices is set based on the determined number. Specifically, how to determine a correlation $\gamma_{Disk\ i, Disk\ j}$ between the ith storage device and the jth storage device will be described with reference to FIG. 6.

Figure 6:
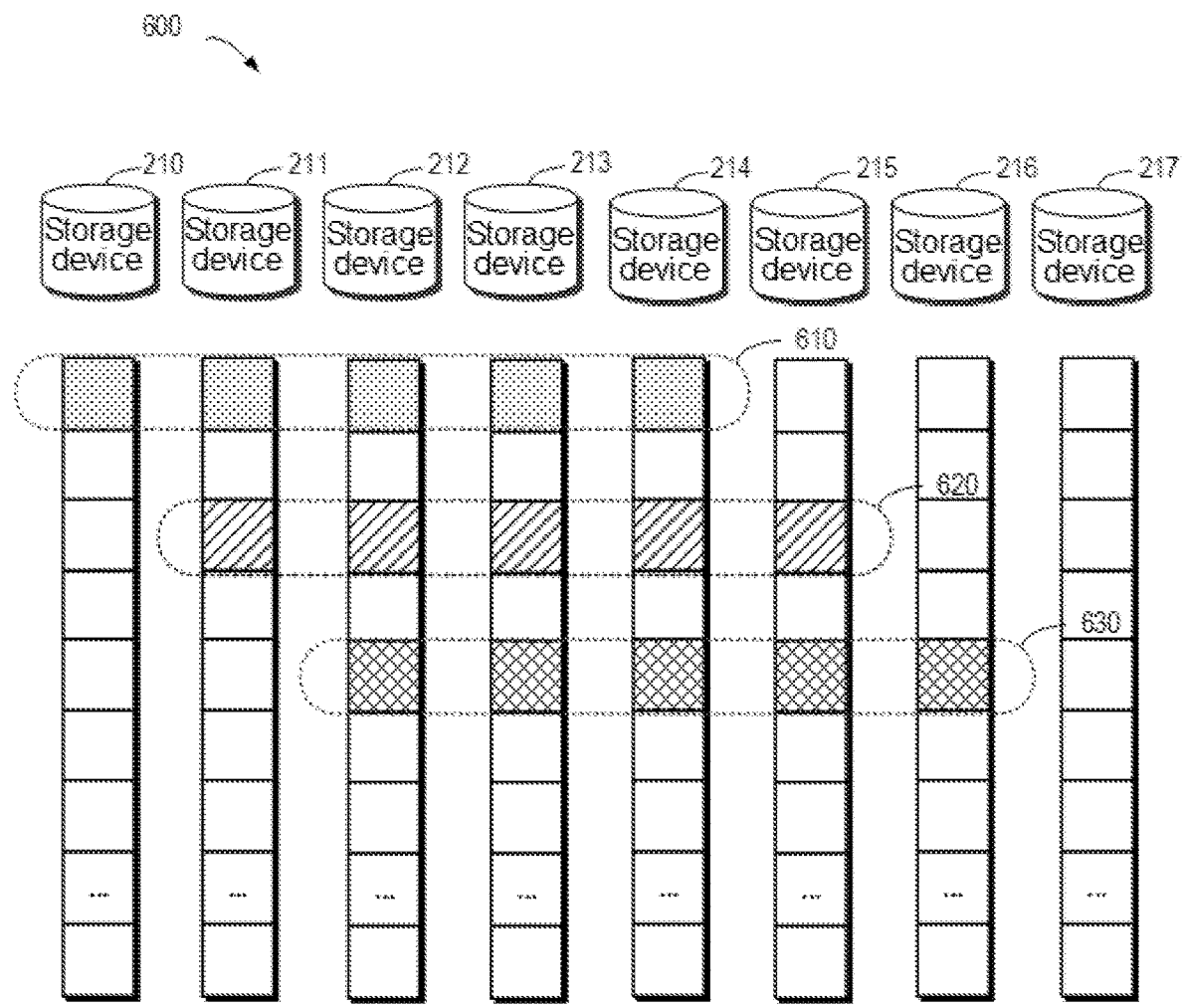
FIG. 6 schematically shows a block diagram of a process of determining a correlation between two storage devices according to one implementation of the present disclosure.

FIG. 6 schematically shows block diagram 600 of a process of determining a correlation between two storage devices according to one implementation of the present disclosure. As shown in FIG. 6, three stripes 610, 620, and 630 have been created in the storage system, and the correlation $\gamma_{Disk\ i,Disk\ j}$ may be determined based on the number of stripes that jointly involve the ith storage device and the jth storage device. If it is expected to determine a correlation between storage device 210 and storage device 211 (i.e., i=0, j=1), it may be found that only stripe 610 uses extents in storage device 210 and storage device 211 at the same time, and thus $\gamma_{Disk\ 0,Disk\ 1}=1$.

For another example, if it is expected to determine a correlation between storage device 211 and storage device 212 (i.e., i=1, j=2), it may be found that stripe 610 uses extents in storage device 210 and storage device 211 at the same time, and stripe 620 also uses the extents in storage device 210 and storage device 211 at the same time, and thus $\gamma_{Disk\ 1,Disk\ 2}=2$. Similarly, a correlation between any two storage devices in the plurality of storage devices may be determined. It will be understood that a mapping relationship between the stripes and the extents in the stripes may be conveniently obtained from address mapping 330 of the storage system. Thus, with the example implementation of the present disclosure, a correlation between any two storage devices may be determined in a simple and effective manner.

According to an example implementation of the present disclosure, a device correlation of a specific storage device in the plurality of storage devices may be determined based on a correlation between two storage devices. Specifically, a correlation between the specific storage device and each of the storage devices other than the specific storage device may be determined respectively. Further, the device correlation of the specific storage device may be determined based on the determined correlations.

According to an example implementation of the present disclosure, the device correlation may be set to be directly proportional to the correlation between the storage device and each of the other storage devices. For example, a plurality of correlations may be acquired, and the device correlation may be determined based on a summation operation. With the example implementation of the present disclosure, the device correlation of the specific storage device may be determined based on the correlation between the specific storage device and another storage device on the basis of simple mathematical operations.

Assuming that it is expected to determine a device correlation of the ith storage device, a correlation between the ith storage device and another jth storage device (0≤j≤M−1, and i≠j) may be determined based on the method described above with reference to FIG. 6. According to an example implementation of the present disclosure, the device correlation $\gamma_{Disk\ i}$ of the ith storage device may be determined based on the following formula 1:

$$\gamma_{Disk\ i} = \sum_{j=0}^{M-1} \gamma_{Disk\ i, Disk\ j} \qquad \text{Formula 1}$$

Wherein $\gamma_{Disk\ i}$ indicates the device correlation of the ith storage device, $\gamma_{Disk\ i, Disk\ j}$ indicates the correlation between the ith storage device and the jth storage device, and M indicates the number of storage devices in a resource pool.

With the example implementation of the present disclosure, for the ith storage device, a device correlation $\gamma_{Disk\ i}$ of the device indicates a sum of correlations between the ith storage device and other M−1 storage devices. In this case, the device correlation may accurately measure a degree of correlation between the ith storage device and the other storage devices, and may reflect a workload of the storage device. Selecting a storage device for creating a stripe based on the device correlation can accurately select a suitable storage device that helps achieve load balance based on the workloads of the storage devices.

It will be understood that formula 1 above only schematically shows a specific example of determining the device correlation. According to an example implementation of the present disclosure, other formulas may also be used to determine the device correlation. For example, the device correlation may be determined based on a product of a plurality of correlations.

According to an example implementation of the present disclosure, device correlations of the plurality of storage devices may be respectively determined based on formula 1 described above, and the balance index of the storage device may be determined based on the device correlation of the storage device and the device correlations of the plurality of storage devices. For example, the balance index $C_{Disk\ i}$ of the ith storage device may be determined based on the following formula 2:

$$C_{Disk\ i} = \frac{\gamma_{Disk\ i}}{\sum_{j=0}^{M-1} \gamma_{Disk\ j}} \qquad \text{Formula 2}$$

Wherein $C_{Disk\ i}$ indicates the balance index of the ith storage device, $\gamma_{Disk\ i}$ indicates the device correlation of the ith storage device, and M indicates the number of storage devices in a resource pool. With the example implementation of the present disclosure, the numerator part $\gamma_{Disk\ i}$ may indicate distribution of a set of stripes involved by the ith storage device, and the denominator part $\sum_{j=0}^{M-1} \gamma_{Disk\ j}$ may indicate distribution of all stripes involved by all storage devices in the storage system, so a ratio of the two may accurately reflect a balance degree of the ith storage device.

It will be understood that the balance index above only indicates the influence of stripe distribution on the performance of a storage device. According to an example implementation of the present disclosure, there may also be other factors that affect the workload. For example, when an access load of a storage device is high, the performance of the storage device will decrease. For another example, when a wear degree of a storage device is high, the reliability of the storage device will decrease. It will be understood that the wear degree is an indicator indicating the service life of a storage device, and a high wear degree means that the remaining usage time of the storage device is reduced. When the wear degree reaches a certain threshold, it means that the life of the storage device is about to end, and the storage device needs to be replaced in time.

According to an example implementation of the present disclosure, the balance index may be updated based on the access load of the storage device. Specifically, the access load of the storage device may be determined, and access loads of the plurality of storage devices may be determined respectively. Access load may have various representations. For example, at least one of the following may be used to represent the access load: the number of accesses per unit time, the volume of data accesses per unit time, the total number of accesses, the total volume of data accesses, and so on. Then, the balance index of the storage device may be updated based on the access load of the storage device and the access loads of the plurality of storage devices. According to an example implementation of the present disclosure, the balance index $C_{Disk\ i}$ of the ith storage device may be determined based on the following formula 3.

$$C_{Disk\ i} = \omega_\gamma \cdot \frac{\gamma_{Disk\ i}}{\sum_{j=0}^{M-1} \gamma_{Disk\ j}} + \omega_T \cdot \frac{T_{Disk\ i}}{\sum_{j=0}^{M-1} T_{Disk\ j}} \qquad \text{Formula 3}$$

Wherein $C_{Disk\ i}$ indicates the balance index of the ith storage device, $\gamma_{Disk\ i}$ indicates the device correlation of the ith storage device, $\gamma_{Disk\ j}$ indicates the device correlation of the jth storage device, M indicates the number of storage devices in a resource pool, $T_{Disk\ i}$ indicates the access load of the ith storage device, $\Sigma_{j=0}^{M-1} T_{Disk\ j}$ indicates a sum of access loads of all M storage devices, and $\omega_\gamma$ and $\omega_T$ respectively indicate weights related to the stripe distribution and the access loads.

It will be understood that formula 3 above is only a schematic way to determine the balance index. According to an example implementation of the present disclosure, the balance index may be determined based on other formulas, For example, the balance index may be determined based on a product of stripe distribution and an access load.

According to an example implementation of the present disclosure, the balance index may be updated based on the wear degree of the storage device. Specifically, the wear degree of the storage device may be determined, and wear degrees of the plurality of storage devices may be determined respectively. Wear degree may have various representations. For example, at least one of the following may be used to indicate the wear degree: the number of write operations that have been performed, a ratio of the number of write operations that have been performed to a predetermined threshold, and so on. Then, the balance index of the storage device may be updated based on the wear degree of the storage device and the wear degrees of the plurality of storage devices. According to an example implementation of the present disclosure, the balance index $C_{Disk\ i}$ of the ith storage device may be determined based on the following formula 4.

$$C_{Disk\ i} = \omega_\gamma \cdot \frac{\gamma_{Disk\ i}}{\sum_{j=0}^{M-1} \gamma_{Disk\ j}} + \omega_W \cdot \frac{W_{Disk\ i}}{\sum_{j=0}^{M-1} W_{Disk\ j}} \qquad \text{Formula 4}$$

Wherein $C_{Disk\ i}$ indicates the balance index of the ith storage device, $\gamma_{Disk\ i}$ indicates the device correlation of the ith storage device, $\gamma_{Disk\ j}$ indicates the device correlation of the jth storage device, M indicates the number of storage devices in a resource pool, $W_{Disk\ i}$ indicates the wear degree of the ith storage device, $\Sigma_{j=0}^{M-1} W_{Disk\ i}$ indicates a sum of wear degrees of all M storage devices, and $\omega_\gamma$ and $\omega_W$ respectively indicate weights related to the stripe distribution and the wear degrees.

It will be understood that formula 4 above is only a schematic way to determine the balance index. According to an example implementation of the present disclosure, the balance index may be determined based on other formulas. For example, the balance index may be determined based on a product of stripe distribution and a wear degree.

According to an example implementation of the present disclosure, the balance index $C_{Disk\ i}$ of the ith storage device may be determined based on the following formula 5.

$$C_{Disk\ i} = \omega_\gamma \cdot \frac{\gamma_{Disk\ i}}{\sum_{j=0}^{M-1} \gamma_{Disk\ j}} + \omega_T \cdot \frac{T_{Disk\ i}}{\sum_{j=0}^{M-1} T_{Disk\ j}} + \omega_W \cdot \frac{W_{Disk\ i}}{\sum_{j=0}^{M-1} W_{Disk\ j}} \qquad \text{Formula 5}$$

Wherein $C_{Disk\ i}$ indicates the balance index of the ith storage device, $\gamma_{Disk\ i}$ indicates the device correlation of the ith storage device, $\gamma_{Disk\ j}$ indicates the device correlation of the jth storage device, M indicates the number of storage devices in a resource pool, $T_{Disk\ i}$ indicates the access load of the ith storage device, $\Sigma_{j=0}^{M-1} T_{Disk\ j}$ indicates the sum of access loads of all M storage devices, $W_{Disk\ i}$ indicates the wear degree of the ith storage device, $\Sigma_{j=0}^{M-1} W_{Disk\ i}$ indicates the sum of wear degrees of all M storage devices, and $\omega_\gamma$, $\omega_T$ and $\omega_W$ respectively indicate weights related to the stripe distribution, the access loads, and the wear degrees.

It will be understood that formula 5 above is only a schematic way to determine the balance index. According to an example implementation of the present disclosure, the balance index may be determined based on other formulas. For example, the balance index may be determined based on a product of stripe distribution, an access load, and a wear degree. According to an example implementation of the present disclosure, value ranges of $\omega_\gamma$, $\omega_T$, and $\omega_W$ may be set. For example, $\omega_\gamma + \omega_T + \omega_W = 1$ can be defined. According to an example implementation of the present disclosure, a value range may be specified for each weight. For example, the value range of each weight may be determined based on the following Table 1.

TABLE 1

| Value ranges of weights | |
|---|---|
| Weight | Value range |
| $\omega_\gamma$ | 0.6–1 |
| $\omega_T$ | 0–0.3 |
| $\omega_W$ | 0–0.1 |

It will be understood that Table 1 above only schematically shows a specific example of the value ranges. Generally speaking, stripe distribution has a great influence on the performance of a storage device, so $\omega_\gamma$ may be set as a high weight. According to an example implementation of the present disclosure, assuming that the plurality of storage devices in the storage system already have a high wear degree, in this case, weight $\omega_W$ of the wear degree may be set as a high value.

How to determine the balance index of each storage device has been described above, and how to select the source storage device based on the balance index will be described below. Returning to block 520 of FIG. 5, according to the determined balance indexes, the source storage device is selected from the plurality of storage devices. It will be understood that the larger the value of $C_{Disk\ i}$ is, the more the workload of the ith storage device deviates from an average value. According to an example implementation of the present disclosure, a storage device with a high balance index may be selected first.

Specifically, if the balance index $C_{Disk\ i}$ of the ith storage device is higher than the balance index $C_{Disk\ j}$ of the jth storage device in the plurality of storage devices, the ith storage device may be selected. In this way, a storage device with poor balance degree may be found preferentially, and extents in the storage device are preferentially moved to other storage devices to reduce a workload of the storage device. According to an example implementation of the present disclosure, balance indexes for all storage devices may be compared, and a storage device with the highest balance index is selected. In this way, a storage device with the worst balance degree may be quickly found in a convenient and effective manner.

At block 530, a source extent is selected from a set of extents that have been allocated in the source storage device. It will be understood that, in this case, the source storage device is the storage device with the worst balance degree in the plurality of storage devices, and moving any extent in the source storage device to other storage devices will improve the balance degree of the source storage device. According to an example implementation of the present disclosure, in order to improve the balance degree of the source storage device more quickly, an extent that has the greatest influence on the balance degree may be selected from the source storage device, and the data in the extent is moved to other storage devices.

It will be understood that the balance index of the storage device is associated with the stripes where various extents in the storage device are located, and the influences of the stripes where all the extents are located on the balance index may be determined one by one. Specifically, for a given extent in a set of extents that have been allocated in the source storage device, the influence of the stripe where the given extent is located on the balance index of the storage device may be determined. The given stripe where the given extent is located may be determined first. Assuming that each storage device includes P extents, the influence of each of the P extents may be determined for the extent.

For the kth extent in the P extents, assuming that the extent is located in the kth stripe, in this case, a set of storage devices involved by the kth stripe may be determined. Assuming that the width of the stripe is N, in this case, the set of storage devices includes N storage devices. The correlation of the kth stripe may be determined based on the device correlation of each storage device in the set of storage devices, and then the influence of the kth extent on the balance index is determined. The correlation $\gamma_{RE\ k}$ of the kth stripe may be determined based on the following formula 6.

$$\gamma_{REk} = \sum_{Disk\ j \in RE\ k} \gamma_{Disk\ j} \qquad \text{Formula 6}$$

Wherein $\gamma_{RE\ k}$ indicates the correlation of the kth stripe, $\gamma_{Disk\ j}$ indicates the device correlation of the jth storage device, and the jth storage device is a storage device involved by the kth stripe (in other words, an extent included in the kth stripe is located in the jth storage device).

Further, the influence of the kth extent on the balance index may be determined based on the correlation $\gamma_{RE\ k}$ of the kth stripe. For example, the influence of a set of extents on the balance index of the storage device may be determined, and the given extent is selected as the source extent based on the influence of the given extent and the influence of the set of extents. Specifically, the influence $C_{RE\ k}$ of the kth extent on the balance degree may be determined based on the following formula 7.

$$C_{RE\ k} = \frac{\gamma_{REk}}{\sum_{j=0}^{P-1} \gamma_{RE\ j}} \qquad \text{Formula 7}$$

Wherein $C_{RE\ k}$ indicates the influence of the kth extent on the balance index, $\gamma_{RE\ k}$ indicates the correlation of the kth stripe, $\gamma_{RE\ j}$ indicates the correlation of the jth stripe, and P indicates the number of extents included in the ith storage device. It will be understood that formula 7 described above is only schematic, and the influence $C_{RE\ j}$ of the kth extent on the balance index may also be determined only based on the numerator part in formula 7.

According to an example implementation of the present disclosure, at least any one of the access load of the storage device and the wear degree of the storage device may also be considered when the influence is determined. In this case, the influence may be updated based on the access load and/or the wear degree.

According to an example implementation of the present disclosure, the influence $C_{RE\ k}$ of the kth extent on the balance degree may be determined by using the following formula 8.

$$C_{RE\ k} = \omega_\gamma \cdot \frac{\gamma_{REk}}{\sum_{j=0}^{P-1} \gamma_{RE\ j}} + \omega_T \cdot \frac{T_{RE\ k}}{\sum_{j=0}^{P-1} T_{RE\ j}} \qquad \text{Formula 8}$$

Wherein $C_{RE\ k}$ indicates the influence of the kth extent on the balance index, $\gamma_{RE\ k}$ indicates the correlation of the kth stripe, $\gamma_{RE\ j}$ indicates the correlation of the jth stripe, P indicates the number of extents included in the ith storage device, $T_{RE\ k}$ indicates the related access load of the kth stripe, $T_{RE\ j}$ indicates the related access load of the jth stripe, and $\omega_\gamma$ and $\omega_T$ indicate weights related to the stripe distribution and the access loads respectively.

According to an example implementation of the present disclosure, the influence $C_{RE\ k}$ of the kth extent on the balance degree may be determined by using the following formula 9.

$$C_{RE\ k} = \omega_\gamma \cdot \frac{\gamma_{REk}}{\sum_{j=0}^{P-1} \gamma_{RE\ j}} + \omega_W \cdot \frac{W_{RE\ k}}{\sum_{j=0}^{P-1} W_{RE\ j}} \qquad \text{Formula 9}$$

Wherein $C_{RE\ k}$ indicates the influence of the kth extent on the balance index, $\gamma_{RE\ k}$ indicates the correlation of the kth stripe, $\gamma_{RE\ j}$ indicates the correlation of the jth stripe, P indicates the number of extents included in the ith storage device, $W_{RE\ k}$ indicates the related wear degree of the kth stripe, $W_{RE\ j}$ indicates the related wear degree of the jth stripe, and $\omega_\gamma$ and $\omega_W$ indicate weights related to the stripe distribution and the wear degrees respectively.

According to an example implementation of the present disclosure, the influence $C_{RE\ k}$ of the kth extent on the balance degree may be determined by using the following formula 10.

$$C_{RE\ k} = \qquad\qquad\qquad\qquad\qquad\qquad \text{Formula 10}$$
$$\omega_\gamma \cdot \frac{\gamma_{RE\ k}}{\sum_{j=0}^{M-1} \gamma_{RE\ j}} + \omega_T \cdot \frac{T_{RE\ k}}{\sum_{j=0}^{M-1} T_{RE\ j}} + \omega_W \cdot \frac{W_{RE\ k}}{\sum_{j=0}^{M-1} W_{RE\ j}}$$

Wherein $C_{RE\ k}$ indicates the influence of the kth extent on the balance index, $\gamma_{RE\ k}$ indicates the correlation of the kth stripe, $\gamma_{RE\ j}$ indicates the correlation of the jth stripe, P indicates the number of extents included in the ith storage device, $T_{RE\ k}$ indicates the related access load of the kth stripe, $T_{RE\ j}$ indicates the related access load of the jth stripe, $W_{RE\ k}$ indicates the related wear degree of the kth stripe, $W_{RE\ j}$ indicates the related wear degree of the jth stripe, and $\omega_\gamma$, $\omega_T$, and $\omega_W$ indicate weights related to the stripe distribution, the access loads, and the wear degrees respectively.

It will be understood that the above formulas 8 to 10 are merely schematic ways to determine the influence. According to an example implementation of the present disclosure, the influence may be determined based on other formulas. For example, the influence may be determined based on a product of a correlation, an access load, and a wear degree. With the example implementation of the present disclosure, the influence of each extent in the ith storage device on the balance index may be determined in a convenient and effective manner, and then the extent (e.g., the kth extent) that has the greatest influence on the balance index may be selected. Then, data in the kth extent in the ith storage device may be moved to an idle extent in the destination storage device.

According to an example implementation of the present disclosure, the destination storage device may be selected from the plurality of storage devices. The destination storage device may be selected based on a plurality of ways. For example, the source storage device has the largest balance index, and in this case, a storage device with the smallest balance index may be selected from the plurality of storage devices as the destination storage device. For another example, the destination storage device may also be selected based on a stripe correlation between a storage device to be selected and a current stripe. According to an example implementation of the present disclosure, the concept of stripe correlation is proposed. Here, stripe correlation describes a correlation between one storage device and a plurality of storage devices where one stripe is located. The higher the stripe correlation, the closer the relationship between the storage device and the stripe. For example, a stripe correlation $\gamma_{Disk\ u,RE\ k}$ between the uth storage device and the kth stripe may be determined based on the following formula 11.

$$\gamma_{Disk\ u,RE,k} = \sum_{Disk\ j \in RE_k} \gamma_{Disk\ u,Disk\ j} \qquad \text{Formula 11}$$

Wherein $\gamma_{Disk\ u,RE\ k}$ indicates a stripe correlation between the uth storage device and the kth stripe, $\gamma_{Disk\ u,Disk\ j}$ indicates a correlation between the uth storage device and the jth storage device, M indicates the number of storage devices in a resource pool, and the jth storage device indicates various storage devices including extents in the kth stripe.

With the example implementation of the present disclosure, the correlations between a storage device and storage devices where all extents in a stripe are located can reflect degrees of closeness between the storage device and all storage devices involved by the stripe. By summing the plurality of correlations, a degree of closeness between the device and the stripe may be determined in a simple and effective manner.

It will be understood that since a plurality of extents in the stripe need to be located in different storage devices, it is necessary to select extents from other storage devices not involved by the stripe to create a stripe. In this case, a set of storage devices involved by the stripe and a set of storage devices not involved by the stripe may be determined. Specifically, in the plurality of storage devices, a first set of storage devices that do not include any extent in the stripe (the destination storage device can only be selected from this set of storage devices) may be determined, and a second set of storage devices that include the extents in the stripe may be determined. For a given storage device in the first set of storage devices, a device correlation between the given storage device and each storage device in the second set of storage devices may be determined respectively to determine the stripe correlation between the given storage device and the stripe.

Continuing the example above, the stripe includes five extents, and it is expected to move data in the source extent to the destination storage device. In this case, it is necessary to use an idle extent in the destination storage device to replace the kth extent in the ith storage device. Therefore, it may be considered that the stripe only includes 5−1=4 extents (the kth extent in the ith storage device is excluded), and it is expected to select the last extent to form a new stripe. With the example implementation of the present disclosure, when the last extent in the stripe is selected, the stripe correlation can be used to select extents in a storage device with a small correlation in a simple and effective manner.

Specifically, a storage device with a low stripe correlation may be selected from the plurality of storage devices. Assuming that the stripe correlation of one storage device in the plurality of storage devices is lower than stripe correlations of other storage devices in the plurality of storage devices, the storage device may be selected. With the example implementation of the present disclosure, a storage device that has a low correlation with the devices where extents in the current stripe are located may be selected based on the stripe correlation, such that the degrees of closeness of all storage devices where the extents in the created stripe are located are relatively low.

According to an example implementation of the present disclosure, the stripe correlations of all storage devices may be compared, and an extent in the storage device with the smallest stripe correlation may be selected as the last extent in the stripe. In this way, storage devices that are not closely related with the four storage devices involved by the current stripe may be utilized as much as possible, which allows the stripe to run with high performance.

For convenience of description, symbol $\gamma_{Disk\ u,RE\ k}$ may be used to indicate the stripe correlation between the uth storage device and the kth stripe. RE k indicates a storage device where an extent in the current stripe is located. In order to determine the last extent in the stripe, the storage device with the smallest stripe correlation may be selected. Assuming that the ith (i=0) storage device has the highest balance index and the kth extent in the storage device has the greatest influence on the balance index, in this case, the kth extent in the 0th storage device may be used as the source extent. Assuming that five extents in the kth stripe where the kth extent is located are located in the 0th to 4th storage devices respectively, in this case, RE k indicates the 1st to 4th storage devices where other extents are located. The destination storage device may be selected from the remaining storage devices (that is, the 5th, 6th, and 7th storage devices) in the eight storage devices.

The stripe correlations of the 5th, 6th, and 7th storage devices may be determined based on formula 11 described above respectively. Assuming that the 5th storage device has the smallest stripe correlation with the stripe, an idle extent in the 5th storage device may be selected as a destination extent for rebalance. With the example implementation of the present disclosure, the destination storage device for the rebalance operation may be selected only through simple mathematical calculations. In this way, it can be ensured each time that an idle extent in a destination storage device that most contributes to load balance is selected from the plurality of storage devices as the destination extent.

Selecting the destination storage device based on the stripe correlation has been described above. According to an example implementation of the present disclosure, the storage device may also be selected based on the stripe correlation and the device correlation of the storage device. It will be understood that a plurality of extents in a stripe will be accessed in association, and selecting a storage device based on the stripe correlation may consider the interaction between all storage devices in the created stripe. During subsequent operations, the performance of the storage device will also be affected by the correlation (that is, device correlation) between the storage device and other storage devices. Thus, the destination storage device may be selected based on the stripe correlation and the device correlation. With the example implementation of the present disclosure, the above two factors can be fully considered to improve the overall performance of the storage system.

According to an example implementation of the present disclosure, a combined correlation $\gamma'_{Disk\ u,RE\ k}$ between the uth storage device and the kth stripe may be determined based on formula 12.

$$\gamma'_{Disk\ u,RE\ k} = \gamma_{Disk\ u} + \gamma_{Disk\ u,RE\ k} \quad \text{Formula 12}$$

Wherein $\gamma'_{Disk\ u,RE\ k}$ indicates the combined correlation between the uth storage device and stripe k, $\gamma_{Disk\ u,RE\ k}$ indicates the stripe correlation between the uth storage device and stripe k, and $\gamma_{Disk\ u}$ indicates the device correlation of the uth storage device. It will be understood that formula 12 is only a specific example of calculating the combined correlation, and according to an example implementation of the present disclosure, the combined correlation may be determined by using other formulas. For example, the combined correlation may be determined based on a product of a stripe correlation and a device correlation.

According to an example implementation of the present disclosure, a score of each storage device that can be used as the destination storage device may be determined. For example, the score $C_{Disk\ u,RE\ k}$ of the uth storage device may be determined based on formula 13, and the score indicates the score of selecting the last extent in the stripe k from the uth storage device. A storage device with a low score may be preferentially selected.

$$C_{Disk\ u,RE\ k} = \frac{\gamma_{Disk\ u} + \gamma_{Disk\ u,RE\ k}}{\sum_{Disk\ v \notin RE\ k} (\gamma_{Disk\ v} + \gamma_{Disk\ v,RE\ k})} \quad \text{Formula 13}$$

Wherein $C_{Disk\ u,RE\ k}$ indicates the score of the uth storage device, $\gamma_{Disk\ u}$ indicates the device correlation of the uth storage device $\gamma_{Disk\ u,RE\ k}$ indicates the stripe correlation between the uth storage device and the kth stripe, Disk v indicates the vth storage device, in the storage system, which does not belong to the kth disk, and $\gamma_{Disk\ v,RE\ k}$ indicates the stripe correlation between the vth storage device and the kth stripe.

Further, the score of the given storage device may be determined based on at least any one of the access load of the given storage device and the wear degree of the given storage device, as well as the stripe correlation.

According to an example implementation of the present disclosure, the score $C_{Disk\ u,RE\ k}$ of the uth storage device may be determined based on formula 14.

$$C_{Disk\ u,RE\ k} = \omega_\gamma \cdot \frac{\gamma_{Disk\ u} + \gamma_{Disk\ u,RE\ k}}{\sum_{Disk\ v \notin RE\ k} (\gamma_{Disk\ v} + \gamma_{Disk\ v,RE\ k})} + \omega_T \cdot \frac{T_{Disk\ u}}{\sum_{Disk\ v \notin RE\ k} T_{Disk\ v}} \quad \text{Formula 14}$$

Wherein meanings of all symbols are the same as those in formula 13, in which $T_{Disk\ u}$ indicates the access load of the uth storage device, $T_{Disk\ v}$ indicates the access load of the vth storage device, and $\omega_\gamma$ and $\omega_T$ indicate weights related to the stripe distribution and the access loads respectively. According to an example implementation of the present disclosure, the score $C_{Disk\ u,RE\ k}$ of the uth storage device may be determined based on formula 15.

$$C_{Disk\ u,RE\ k} = \omega_\gamma \cdot \frac{\gamma_{Disk\ u} + \gamma_{Disk\ u,RE\ k}}{\sum_{Disk\ v \notin RE\ k} (\gamma_{Disk\ v} + \gamma_{Disk\ v,RE\ k})} + \omega_W \cdot \frac{W_{Disk\ u}}{\sum_{Disk\ v \notin RE\ k} W_{Disk\ v}} \quad \text{Formula 15}$$

Wherein meanings of all symbols are the same as those in formula 13, in which $W_{Disk\ u}$ indicates the access load of the uth storage device, $W_{Disk\ v}$ indicates the access load of the vth storage device, and $\omega_\gamma$ and $\omega_W$ indicate weights related to the stripe distribution and the wear degrees respectively. According to an example implementation of the present disclosure, the score $C_{Disk\ u,RE\ k}$ of the uth storage device may be determined based on formula 16.

$$C_{Disk\ u,RE\ k} = \omega_\gamma \cdot \frac{\gamma_{Disk\ u} + \gamma_{Disk\ u,RE\ k}}{\sum_{Disk\ v \notin RE\ k} (\gamma_{Disk\ v} + \gamma_{Disk\ v,RE\ k})} + \omega_T \cdot \frac{T_{Disk\ u}}{\sum_{Disk\ v \notin RE\ k} T_{Disk\ v}} + \omega_W \cdot \frac{W_{Disk\ u}}{\sum_{Disk\ v \notin RE\ k} W_{Disk\ v}} \quad \text{Formula 16}$$

Wherein meanings of all symbols are the same as those in formulas 13 to 15, and $\omega_\gamma$, $\omega_T$, and $\omega_W$ indicate weights related to the stripe distribution, the access loads, and the wear degrees, respectively. It will be understood that formulas 13 to 16 shown above only schematically show examples of formulas for determining the score. According to an example implementation of the present disclosure, the score may be determined based on other formulas. For example, the influence may be determined based on a product of a combined correlation, an access load, and a wear degree. With the example implementation of the present disclosure, the destination storage device may be selected in a convenient and effective manner.

According to an example implementation of the present disclosure, the storage device with a low score may be selected. Alternatively and/or additionally, a storage device with the lowest score may be selected. With the example implementation of the present disclosure, a storage device with the lowest workload may be preferentially selected based on the score, so that a rebalanced stripe can utilize the storage device in a resource pool with a good working state as much as possible.

Returning to block 540 of FIG. 5, the data in the source extent is moved to the idle extent in the destination storage device in the plurality of storage devices. It will be understood that since moving data will change the distribution of stripes in the storage system, it is necessary to determine the balance index of the destination storage device after the data is moved. According to an example implementation of the present disclosure, if it is determined that the balance index of the source storage device is higher than the balance index of the destination storage device, it means that moving the data can improve the balance index of the storage device. In this case, the data in the source extent can be moved to the idle extent in the destination storage device. Otherwise, it means that moving the data will cause a more serious imbalance, so the operation of moving the data will not be performed. According to an example implementation of the present disclosure, method 500 may be operated periodically in a background of the storage system. Alternatively and/or additionally, method 500 may be triggered to operate according to a predetermined event. For example, method 500 may be operated in response to a command of an administrator. It will be understood that since operating method 500 will result in additional overhead of time and computing resources, method 500 may only be started when the balance index of the storage system deteriorates to a certain extent. Here, the balance index of the storage system may indicate an overall balance state of the storage system. In the following, the balance index of the storage system may be determined based on an average device correlation of all storage devices and a standard deviation of device correlations of the storage devices.

According to an example implementation of the present disclosure, a correlation of the storage system may be determined. The correlation may be, for example, determined based on a sum of correlations among all the storage devices in the storage system. According to an example implementation of the present disclosure, the correlation $\gamma_{StorageSystem}$ of the storage system may be determined based on the following formula 17.

$$\gamma_{StorageSystem} = \sum_{i=0}^{M-1} \gamma_{Disk\ i} = \sum_{i=0}^{M-1} \sum_{j=0}^{M-1} \gamma_{Disk\ i, Disk\ j} \quad \text{Formula 17}$$

Wherein $\gamma_{StorageSystem}$ indicates the correlation of the storage system, $\gamma_{Disk\ i}$ indicates the device correlation of the ith storage device, $\gamma_{Disk\ i, Disk\ j}$ indicates the correlation between the ith storage device and the jth storage device, and M indicates the number of storage devices in the storage system. According to an example implementation of the present disclosure, the average device correlation $\gamma_{Disk\ average}$ of all storage devices in the storage system may be determined based on the following formula 18. Meanings of symbols in formula 18 are the same as those in formula 17.

$$\gamma_{Disk\ average} = \frac{1}{M} \gamma_{StorageSystem} = \frac{1}{M} \sum_{i=0}^{M-1} \gamma_{Disk\ i} \quad \text{Formula 18}$$

According to an example implementation of the present disclosure, the standard deviation σ of device correlations of the storage devices in the storage system may be determined based on the following formula 19. Meanings of symbols in formula 19 are the same as those in formula 17.

$$\sigma = \sqrt{\frac{\sum_{i=0}^{M-1} (\gamma_{Disk\ i} - \gamma_{Disk\ average})^2}{M-1}} \quad \text{Formula 19}$$

According to an example implementation of the present disclosure, the balance index of the storage system may be determined based on the following formula 20.

$$\lambda = \frac{\sigma}{\gamma_{Disk\ average}} \quad \text{Formula 20}$$

Figure 7:
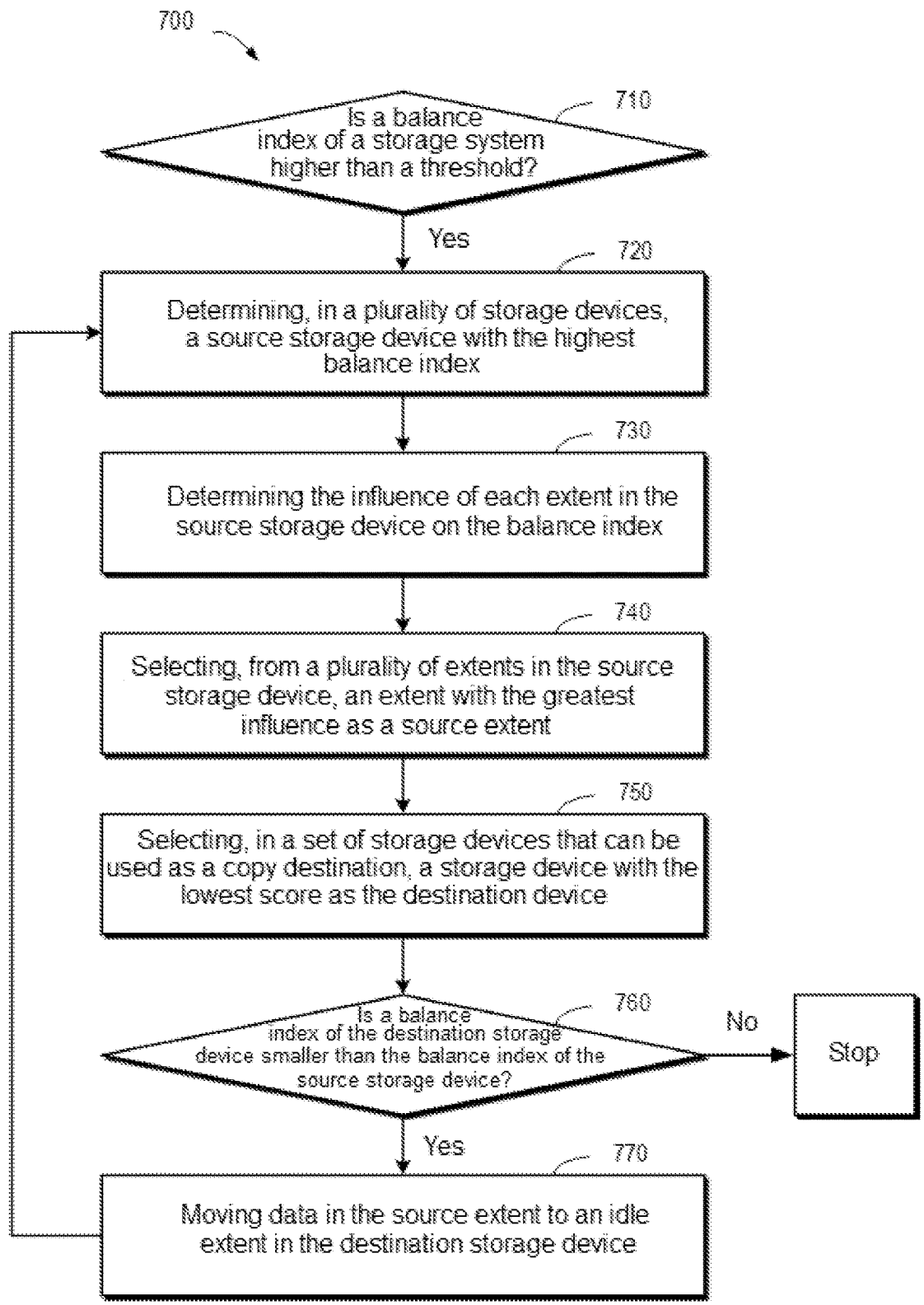
FIG. 7 schematically shows a flowchart of a method for performing rebalance according to one implementation of the present disclosure.

Method 500 described above may be performed when it is determined that the balance index of the storage system meets a predetermined threshold condition (for example, higher than 30% or other numerical values). In the following, a method for performing rebalance according to an example implementation of the present disclosure will be described in detail. FIG. 7 schematically shows a flowchart of method 700 for performing rebalance according to one implementation of the present disclosure. At block 710, whether the balance index of the storage system is higher than a predetermined threshold may be determined. If the balance index of the storage system is higher than the predetermined threshold, method 700 proceeds to block 720. At block 720, a storage device with the highest balance index (i.e., the source storage device) in the plurality of storage devices may be determined. The balance index of each storage device may be determined based on any one of formula 2 to formula 5 described above, and the storage device with the highest balance index is used as the source storage device.

At block 730, the influence of each extent in the source storage device on the balance index may be determined. Specifically, the influence may be determined based on any one of formulas 6 to 10 described above. At block 740, an extent with the greatest influence may be selected. At block 750, in a set of storage devices that can be used as a copy destination, a storage device with the lowest score is selected as the destination storage device. Specifically, the score may be determined based on any one of formulas 11 to 16 described above.

At block 760, the balance index of the destination storage device after copying may be determined and compared with the balance index of the source storage device. If the balance index of the destination storage device is smaller than the balance index of the source storage device, method 700 proceeds to block 770 to move data in the source extent to an idle extent in the destination storage device. According to an example implementation of the present disclosure, the moving operation may be performed in a plurality of rounds. For example, after block 770, method 700 may return to block 720, and a next round of operations may be performed until a determination result at block 760 is "No." With the example implementation of the present disclosure, a plurality of rounds of rebalance operations may be performed collectively. In this way, it may be ensured that the balance index of the storage system will remain in a good condition for a long period of time in the future, and rebalance operations will not be performed frequently.

It will be understood that when the balance index of the storage system is determined, the access load and the wear degree of the storage system may also be considered. Similarly, balance indexes related to access loads and wear degrees of relevant storage devices may be determined (as shown in formula 21 and formula 22).

$$\mu = \frac{\sqrt{\frac{\sum_{i=0}^{M-1}(T_{Disk\ i} - T_{Disk\ average})^2}{M-1}}}{T_{Disk\ average}} \quad \text{Formula 21}$$

Wherein $\mu$ indicates the standard deviation related to the access load of the ith storage device, $T_{Disk\ i}$ indicates the access load of the ith storage device, and $T_{Disk\ average}$ indicates an average value of access loads of the plurality of storage devices.

$$\delta = \frac{\sqrt{\frac{\sum_{i=0}^{M-1}(W_{Disk\ i} - W_{Disk\ average})^2}{M-1}}}{W_{Disk\ average}} \quad \text{Formula 22}$$

Wherein $\delta$ indicates the standard deviation related to the wear degree of the ith storage device, $W_{Disk\ i}$ indicates the access load of the ith storage device, and $W_{Disk\ average}$ indicates an average value of wear degrees of the plurality of storage devices.

According to an example implementation of the present disclosure, the balance index of the storage system may be determined based on the following formula 23.

$$\lambda = \omega_\gamma \cdot \frac{\sigma}{\gamma_{Disk\ average}} + \omega_T \cdot \mu + \omega_W \cdot \delta \quad \text{Formula 23}$$

Figure 8:
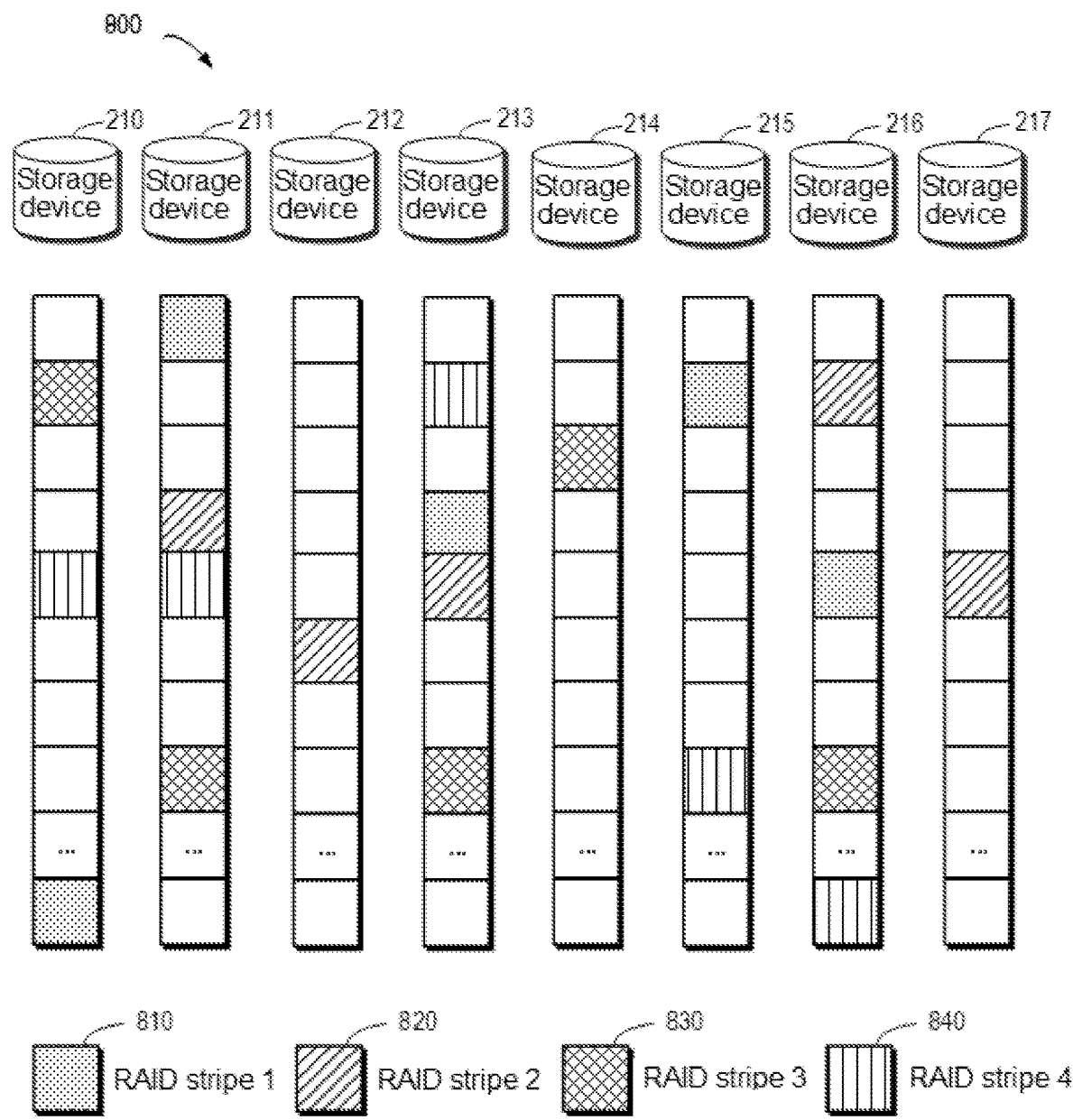
FIG. 8 schematically shows a block diagram of a state of a storage system before rebalance is performed according to one implementation of the present disclosure.

The specific process of how to perform rebalance has been described above, and in the following, states of the storage system before and after the rebalance operation is performed will be described with reference to FIGS. 8 and 9. FIG. 8 schematically shows block diagram 800 of a state of a storage system before rebalance is performed according to one implementation of the present disclosure. There are already four stripes (indicated by legends 810, 820, 830, and 840 respectively) in the storage system, and the following matrix M shows the correlations between various storage devices of the eight storage devices. For example, an intersection between the ith line and the jth column shows the correlation between the ith storage device and the jth storage device.

$$M = \begin{bmatrix} 0 & 3 & 0 & 3 & 1 & 2 & 3 & 0 \\ 3 & 0 & 1 & 4 & 1 & 2 & 3 & 1 \\ 0 & 1 & 0 & 1 & 0 & 0 & 1 & 1 \\ 3 & 4 & 1 & 0 & 1 & 2 & 3 & 1 \\ 1 & 1 & 0 & 1 & 0 & 0 & 1 & 0 \\ 2 & 2 & 0 & 2 & 0 & 0 & 2 & 0 \\ 3 & 3 & 1 & 3 & 1 & 2 & 0 & 1 \\ 0 & 1 & 1 & 1 & 0 & 0 & 1 & 0 \end{bmatrix}$$

It is assumed that access loads of all extents in the four stripes are shown as the following matrix A, wear degrees of all of the eight storage devices are shown as the following matrix B, and the numbers of write accesses for all extents in the four stripes are shown as the following matrix C.

$$A = \begin{bmatrix} 0 & 5 & 8 & 11 & 9 \\ 3 & 7 & 9 & 9 & 8 \\ 6 & 10 & 4 & 0 & 2 \\ 3 & 2 & 1 & 6 & 5 \end{bmatrix}$$

$$B = [120\ 150\ 80\ 120\ 100\ 80\ 160\ 70]$$

$$C = \begin{bmatrix} 0 & 3 & 6 & 6 & 7 \\ 1 & 4 & 6 & 7 & 4 \\ 2 & 5 & 2 & 0 & 1 \\ 3 & 2 & 1 & 6 & 5 \end{bmatrix}$$

The balance index $$\gamma = \frac{\sigma}{\gamma_{Disk\ average}} = 53.38\%$$

of the storage system may be determined based on formula 20. Since $\lambda$ is greater than the threshold condition (e.g., 30%), in this case, method 700 may be performed in a plurality of rounds. In the first round, the balance index of each of the eight storage devices may be determined (for example, expressed in the following matrix):

[16.31% 19.96% 6.07% 19.62% 4.82% 10.13% 16.94% 6.15%]

Since the balance index of the first storage device has a maximum value of "19.96%," the first storage device is selected as the source storage device. Then, the extent that has the greatest influence on the balance index is selected from the source storage device. There are four stripes in the storage device, and the influences of all the stripes may be expressed as the following matrix:

[27.31% 24.16% 24.18% 24.34%]

Since the first stripe has a maximum value of influence of "27.31%," an extent in the first storage device that is included in the first stripe may be used as the source extent. Since the extents in the first stripe are located at the 0th, 1st, 3rd, 5th, and 6th storage devices respectively, the 2nd, 4th, and 7th storage devices may be used as the copy destinations. The scores of all the storage devices may be calculated respectively (wherein the scores of the 0th, 1st, 3rd, 5th, and 6th storage devices are shown as "\"):

[\\24.50% \26.93% \\24.57%]

Since the 2nd storage device has a minimum score of "24.50%," the 2nd storage device may be used as a target storage device. In this example, the balance index (9.76%) of the destination storage device is smaller than the balance index (16.28%) of the source storage device, so the moving operation is performed.

The implementation process of the second round is similar to the process of the first round described above, and thus will not be repeated here. In the second round, the balance index (8.50%) of the destination storage device is smaller than the balance index (15.94%) of the source storage device, so the moving operation is performed. In the third round, the balance index (9.83%) of the destination storage device is smaller than the balance index (13.24%) of the source storage device, so the moving operation is performed. In the fourth round, the balance index (14.64%) of the destination storage device is larger than the balance index (12.60%) of the source storage device, so the moving operation is no longer performed.

Figure 9:
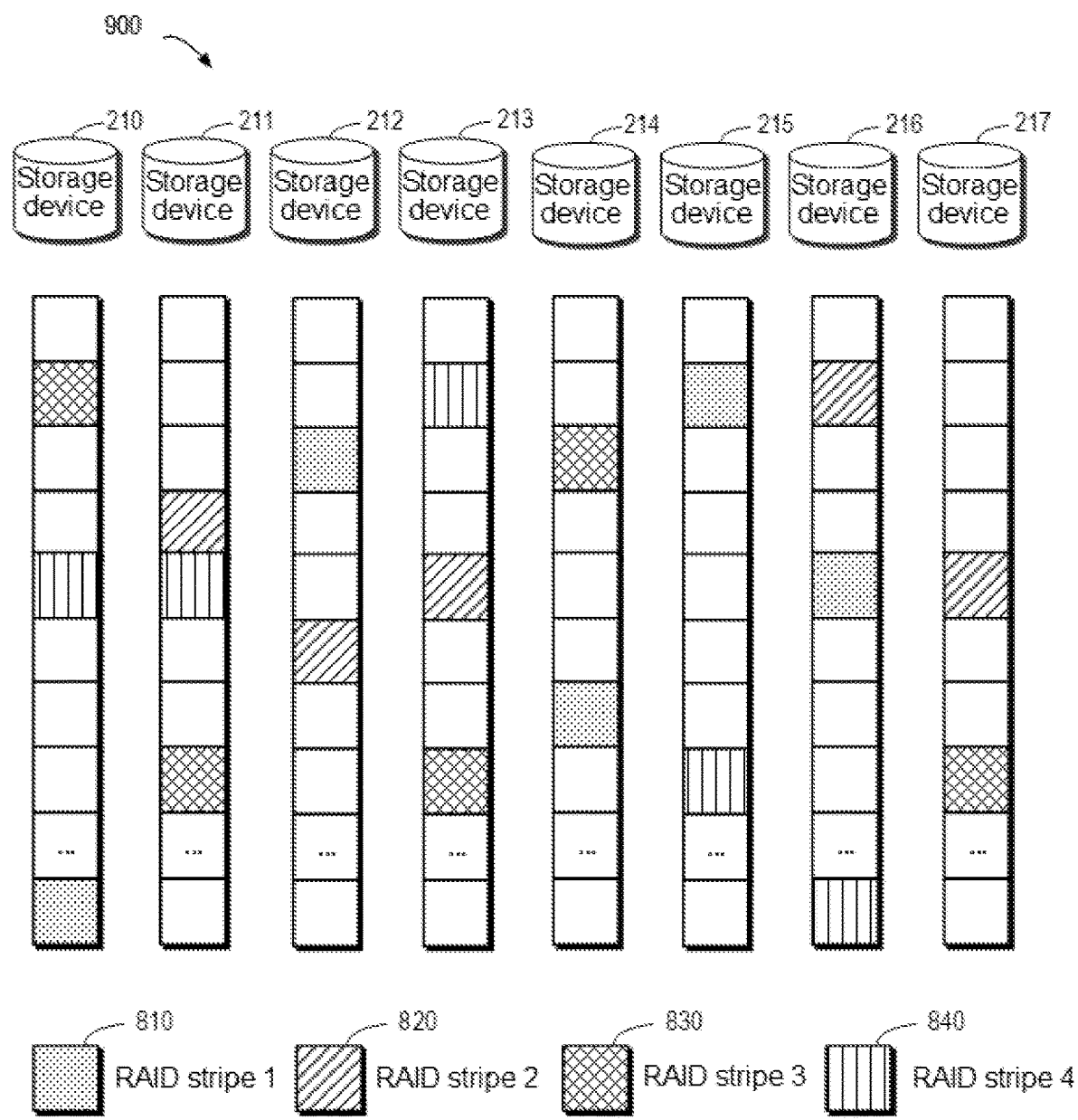
FIG. 9 schematically shows a block diagram of a state of a storage system after rebalance is performed according to one implementation of the present disclosure.

FIG. 9 schematically shows block diagram 900 of a state of a storage system after rebalance is performed according to one implementation of the present disclosure. FIG. 9 shows a storage system after three rounds of rebalance operations. In this case, the correlation of the storage system is reduced from 53.38% before rebalance to 17.79% (much lower than the threshold condition of 30%). In terms of access load, the storage system after the rebalance operation also shows a good result: the balance index is reduced from previous 64.09% to 39.00%. In terms of wear degree, the storage system after the rebalance operation also shows a good result: the balance index is reduced from previous 30.35% to 29.14%. With the example implementation of the present disclosure, the rebalance operation can ensure that the plurality of storage devices are as balanced as possible in terms of correlation, access load, and wear degree. In this way, the performance of the storage system can be prevented from being lowered due to an over-high workload of one storage device.

An example of a method according to the present disclosure has been described in detail above with reference to FIGS. 2 to 9, and implementations of the corresponding apparatus will be described below. According to an example implementation of the present disclosure, an apparatus for managing stripes in a storage system is provided. The apparatus includes: a determination module configured to respectively determine a balance index of a storage device in a plurality of storage devices in the storage system, the balance index indicating a relationship between distribution of a set of stripes involved by the storage device and distribution of a set of stripes involved by the plurality of storage devices; a storage device selection module configured to select a source storage device from the plurality of storage devices based on the determined balance indexes; an extent selection module configured to select a source extent from a set of extents that have been allocated in the source storage device; and a moving module configured to move data in the source extent to an idle extent in a destination storage device in the plurality of storage devices. According to an example implementation of the present disclosure, the apparatus further includes modules for performing methods 500 and 700 described above.

Figure 10:
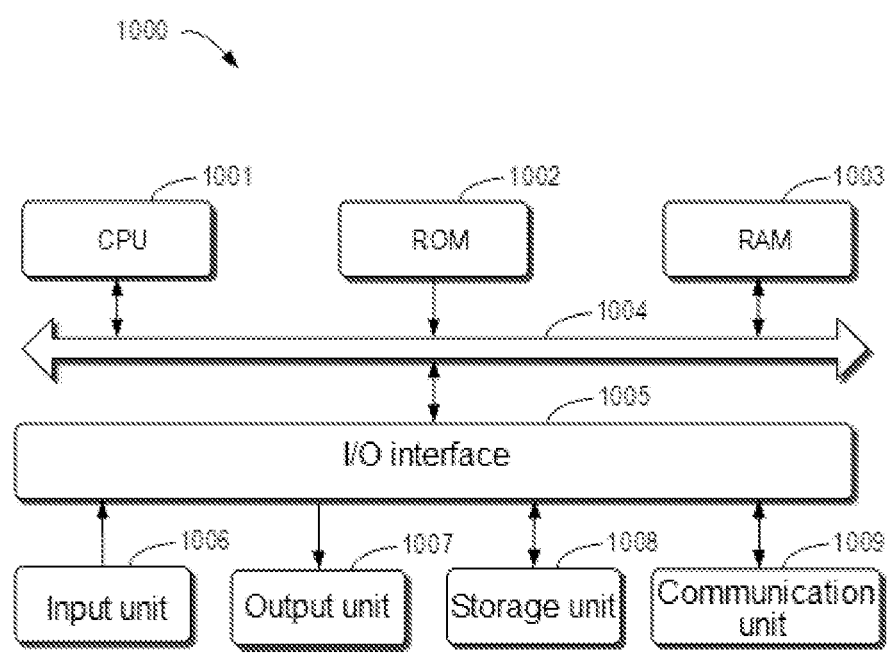
FIG. 10 schematically shows a block diagram of a device for managing stripes in a storage system according to an example implementation of the present disclosure.

FIG. 10 schematically shows a block diagram of device 1000 for managing stripes in a storage system according to an example implementation of the present disclosure. As shown in the figure, device 1000 includes central processing unit (CPU) 1001 that may perform various appropriate actions and processing according to computer program instructions stored in read-only memory (ROM) 1002 or computer program instructions loaded from storage unit 1008 into random access memory (RAM) 1003. In RAM 1003, various programs and data required for the operation of device 1000 can also be stored. CPU 1001, ROM 1002, and RAM 1003 are connected to each other via bus 1004. Input/output (I/O) interface 1005 is also connected to bus 1004.

A plurality of components in device 1000 are connected to I/O interface 1005, including: input unit 1006, e.g., a keyboard, a mouse, etc.; output unit 1007, e.g., various types of displays, speakers, etc.; storage unit 1008, e.g., a magnetic disk, an optical disk, etc.; and communication unit 1009, e.g., a network card, a modem, a wireless communication transceiver, etc. Communication unit 1009 allows device 1000 to exchange information/data with other devices via a computer network such as the Internet and/or various telecommunication networks.

Various processes and processing described above, such as methods 500 and 700, may be performed by processing unit 1001. For example, in some implementations, methods 500 and 700 may be implemented as a computer software program that is tangibly contained in a machine-readable medium, such as storage unit 1008. In some implementations, some or all of the computer program may be loaded and/or installed on device 1000 via ROM 1002 and/or communication unit 1009. When the computer program is loaded into RAM 1003 and executed by CPU 1001, one or more steps of methods 500 and 700 described above may be performed. Alternatively, in other implementations, CPU 1001 may also be configured in any other suitable manner to implement the above-mentioned processes/methods.

According to an example implementation of the present disclosure, an electronic device is provided, including: at least one processor; and a memory coupled to the at least one processor and having instructions stored therein, wherein the instructions, when executed by the at least one processor, cause the device to perform a method for managing stripes in a storage system. The storage system includes a plurality of storage devices, and the method includes: respectively determining a balance index of a storage device in the plurality of storage devices, the balance index indicating a relationship between distribution of a set of stripes involved by the storage device and distribution of a set of stripes involved by the plurality of storage devices; selecting a source storage device from the plurality of storage devices according to the determined balance indexes; selecting a source extent from a set of extents that have been allocated in the source storage device; and moving data in the source extent to an idle extent in a destination storage device in the plurality of storage devices.

According to an example implementation of the present disclosure, determining the balance index of the storage device includes: determining a device correlation of the storage device, the device correlation indicating distribution of a set of stripes involved by the storage system in the storage device and storage devices other than the storage device; determining the device correlations of the plurality of storage devices, respectively; and determining the balance index of the storage device based on the device correlation of the storage device and the device correlations of the plurality of storage devices.

According to an example implementation of the present disclosure, determining the device correlation of the storage device includes: respectively determining a correlation between the storage device and each of the storage devices other than the storage device; and determining the device correlation of the storage device based on the determined correlations.

According to an example implementation of the present disclosure, respectively determining the correlation between the storage device and each of the other storage devices includes: for one of the other storage devices, determining, in a set of stripes, the number of stripes that involve the storage device and the other storage device at the same time; and setting the correlation between the storage device and the other storage device based on the determined number.

According to an example implementation of the present disclosure, determining the device correlation of the storage device includes: setting the device correlation to be directly proportional to the correlation between the storage device and each of the other storage devices.

According to an example implementation of the present disclosure, selecting the source storage device from the plurality of storage devices includes: selecting the source storage device based on a determination that a balance index of the source storage device is higher than another balance index of another storage device in the plurality of storage devices.

According to an example implementation of the present disclosure, the method further includes: determining a balance index of the storage system, the balance index of the storage system indicating distribution of a set of stripes involved by the plurality of storage devices in the storage system; and respectively determining the balance index of each of the plurality of storage devices based on a determination that the balance index of the storage system meets a threshold condition.

According to an example implementation of the present disclosure, determining the balance index of the storage device further includes: determining an access load of the storage device; respectively determining access loads of the plurality of storage devices; and updating the balance index of the storage device based on the access load of the storage device and the access loads of the plurality of storage devices.

According to an example implementation of the present disclosure, determining the balance index of the storage device further includes: determining a wear degree of the storage device; respectively determining wear degrees of the plurality of storage devices; and updating the balance index of the storage device based on the wear degree of the storage device and the wear degrees of the plurality of storage devices.

According to an example implementation of the present disclosure, selecting the source extent includes: for a given extent in a set of extents involved by the source storage device, determining an influence of the given extent on the balance index of the storage device; determining an influence of the set of extents on the balance index of the storage device; and selecting the given extent as the source extent based on the influence of the given extent and the influence of the set of extents.

According to an example implementation of the present disclosure, determining the influence of the given extent on the balance index of the storage device includes: determining a given stripe where the given extent is located; in the plurality of storage devices, determining a set of storage devices that respectively include all extents in the given stripe; and determining the influence based on the device correlation of each storage device in the set of storage devices.

According to an example implementation of the present disclosure, determining the influence of the given extent on the balance index of the storage device further includes: updating the influence based on at least any one of the access load of the storage device and the wear degree of the storage device.

According to an example implementation of the present disclosure, the method further includes selecting the destination storage device from the plurality of storage devices, which includes: for a first set of storage devices that do not include any extent in the stripe where the source extent is located in the plurality of storage devices, determining a stripe correlation between a given storage device in the first set of storage devices and the given stripe; and selecting the destination storage device from the first set of storage devices based on the determined stripe correlation.

According to an example implementation of the present disclosure, determining the stripe correlation between the given storage device and the given stripe includes: determining, in the plurality of storage devices, a second set of storage devices that respectively include all the extents in the stripe; and determining the stripe correlation between the given storage device and the given stripe based on a correlation between the given storage device and each storage device in the second set of storage devices.

According to an example implementation of the present disclosure, the method further includes: determining a score of the given storage device based on at least any one of an access load of the given storage device and a wear degree of the given storage device, as well as the stripe correlation; and selecting the destination storage device based on the score of the given storage device.

According to an example implementation of the present disclosure, selecting the destination storage device from the first set of storage devices based on the determined stripe correlation includes: selecting the destination storage device based on a determination that the stripe correlation of the destination storage device in the first set of storage devices is lower than a stripe correlation of another storage device in the first set of storage devices.

According to an example implementation of the present disclosure, selecting the destination storage device from the first set of storage devices based on the determined stripe correlation further includes: selecting the destination storage device based on the stripe correlation and a device correlation of the destination storage device.

According to an example implementation of the present disclosure, the method further includes: moving the data in the source extent to the idle extent in the destination storage device based on a determination that the balance index of the source storage device is higher than the balance index of the destination storage device.

According to an example implementation of the present disclosure, a computer program product is provided. The computer program product is tangibly stored on a non-transitory computer-readable medium and includes machine-executable instructions, the machine-executable instructions being used for performing the method according to the present disclosure.

According to an example implementation of the present disclosure, a computer-readable medium is provided. The computer-readable medium stores machine-executable instructions that, when executed by at least one processor, cause the at least one processor to implement the method according to the present disclosure.

The present disclosure may be a method, a device, a system, and/or a computer program product. The computer program product may include a computer-readable storage medium on which computer-readable program instructions for implementing various aspects of the present disclosure are loaded. The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or a protruding structure within a groove on which instructions are stored, and any suitable combination of the above. The computer-readable storage medium as used herein is not to be construed as transient signals per se, such as radio waves or other freely propagated electromagnetic waves, electromagnetic waves propagated through waveguides or other transmission media (for example, light pulses propagated through fiber-optic cables), or electrical signals transmitted through electrical wires.

The computer-readable program instructions described herein can be downloaded from the computer-readable storage medium to various computing/processing devices, or downloaded to an external computer or an external storage device via a network, e.g., the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from a network and forwards the computer-readable program instruction for storage in the computer-readable storage medium in each computing/processing device. Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages, such as Smalltalk, C++, and the like, and conventional procedural programming languages such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In cases where a remote computer is involved, the remote computer can be connected to a user's computer over any kind of networks, including a local area network (LAN) or a wide area network (WAN), or can be connected to an external computer (e.g., over the Internet by using an Internet service provider). In some implementations, an electronic circuit (for example, a programmable logic circuit, a field-programmable gate array (FPGA), or a programmable logic array (PLA)) is customized by utilizing state information of computer-readable program instructions, and the electronic circuit may execute the computer-readable program instructions to implement various aspects of the present disclosure.

Various aspects of the present disclosure are described herein with reference to flowcharts and/or block diagrams of the method, apparatus (system), and computer program product according to the implementations of the present disclosure. It should be understood that each block in the flowcharts and/or the block diagrams and combinations of the blocks in the flowcharts and/or the block diagrams may be implemented by computer-readable program instructions.

These computer-readable program instructions can be provided to a processing unit of a general-purpose computer, a special-purpose computer, or another programmable data processing apparatus, thereby producing a machine, such that when these instructions are executed by the processing unit of the computer or another programmable data processing apparatus, an apparatus for implementing the functions/actions specified in one or more blocks in the flowcharts and/or block diagrams is produced. The computer-readable program instructions may also be stored in a computer-readable storage medium. The instructions enable a computer, a programmable data processing apparatuses, and/or other devices to operate in a specific manner, so that the computer-readable medium storing the instructions includes an article of manufacture that includes instructions for implementing various aspects of functions/actions specified in one or more blocks in the flowcharts and/or the block diagrams.

The computer-readable program instructions can also be loaded onto a computer, other programmable data processing apparatuses, or other devices, so that a series of operating steps can be performed on the computer, other programmable data processing apparatuses, or other devices to produce a computer-implemented process. Therefore, the instructions executed on the computer, other programmable data processing apparatuses, or other devices can implement the functions/actions specified in one or more blocks in the flowcharts and/or block diagrams.

The flowcharts and block diagrams in the accompanying drawings show architectures, functions, and operations of possible implementations of the system, method, and computer program product according to a plurality of implementations of the present disclosure. In this regard, each block in the flowcharts or block diagrams may represent a module, a program segment, or part of instructions, which contains one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various implementations of the present disclosure have been described above. The above description is illustrative but not exhaustive, and is not limited to various implementations disclosed. Many modifications and variations will be apparent to a person of ordinary skill in the art without departing from the scope and spirit of the implementations described. The terms used herein are chosen to best explain the principles and practical applications of various implementations or the improvements to technologies in the market, or to enable another person of ordinary skill in the art to understand various implementations disclosed herein.

The invention claimed is:

1. A method for managing stripes in a storage system which comprises a plurality of storage devices, the method comprising:
    determining a balance index of a storage device in the plurality of storage devices, respectively, the balance index indicating a relationship between distribution of a set of stripes involved by the storage device and distribution of a set of stripes involved by the plurality of storage devices;

selecting a source storage device from the plurality of storage devices according to the determined balance indexes;
selecting a source extent from a set of extents that have been allocated in the source storage device; and
moving data in the source extent to an idle extent in a destination storage device in the plurality of storage devices.

2. The method of claim 1, wherein determining the balance index of the storage device comprises:
determining a device correlation of the storage device, the device correlation indicating distribution of the set of stripes involved by the storage system between the storage device and storage devices other than the storage device;
determining device correlations of the plurality of storage devices, respectively; and
determining the balance index of the storage device based on the device correlation of the storage device and the device correlations of the plurality of storage devices.

3. The method of claim 2, wherein determining the device correlation of the storage device comprises:
determining a correlation between the storage device and each of the storage devices other than the storage device, respectively; and
determining the device correlation of the storage device based on the determined correlations.

4. The method of claim 3, wherein respectively determining the correlation between the storage device and each of the other storage devices comprises: for one of the other storage devices,
determining, in the set of stripes, the number of stripes that involve the storage device and the other storage device at the same time; and
setting the correlation between the storage device and the other storage device based on the determined number.

5. The method of claim 3, wherein determining the device correlation of the storage device comprises:
setting the device correlation to be directly proportional to the correlation between the storage device and each of the other storage devices.

6. The method of claim 1, wherein selecting the source storage device from the plurality of storage devices comprises:
selecting the source storage device based on a determination that a balance index of the source storage device is higher than another balance index of another storage device in the plurality of storage devices.

7. The method of claim 1, further comprising:
determining a balance index of the storage system, the balance index of the storage system indicating distribution of the set of stripes involved by the plurality of storage devices in the storage system; and
respectively determining the balance index of the storage device in the plurality of storage devices based on a determination that the balance index of the storage system meets a threshold condition.

8. The method of claim 2, wherein determining the balance index of the storage device further comprises:
determining an access load of the storage device;
determining access loads of the plurality of storage devices, respectively; and
updating the balance index of the storage device based on the access load of the storage device and the access loads of the plurality of storage devices.

9. The method of claim 2, wherein determining the balance index of the storage device further comprises:
determining a wear degree of the storage device;
determining wear degrees of the plurality of storage devices, respectively; and
updating the balance index of the storage device based on the wear degree of the storage device and the wear degrees of the plurality of storage devices.

10. The method of claim 1, wherein selecting the source extent comprises: for a given extent in the set of extents involved by the source storage device,
determining an influence of the given extent on the balance index of the storage device;
determining influences of the set of extents on the balance index of the storage device; and
selecting the given extent as the source extent based on the influence of the given extent and the influences of the set of extents.

11. The method of claim 10, wherein determining the influence of the given extent on the balance index of the storage device comprises:
determining a given stripe where the given extent is located;
determining, in the plurality of storage devices, a set of storage devices that respectively comprise all extents in the given stripe; and
determining the influence based on a device correlation of each storage device in the set of storage devices.

12. The method of claim 11, wherein determining the influence of the given extent on the balance index of the storage device further comprises: updating the influence based on at least any one of an access load of the storage device and a wear degree of the storage device.

13. The method of claim 1, further comprising selecting the destination storage device from the plurality of storage devices, which comprises:
determining, for a first set of storage devices in the plurality of storage devices that do not comprise any extent in a stripe where the source extent is located, a stripe correlation between a given storage device in the first set of storage devices and the given stripe; and
selecting the destination storage device from the first set of storage devices based on the determined stripe correlation.

14. The method of claim 13, wherein determining the stripe correlation between the given storage device and the given stripe comprises:
determining, in the plurality of storage devices, a second set of storage devices that respectively comprise all extents in the stripe; and
determining the stripe correlation between the given storage device and the given stripe based on a correlation between the given storage device and each storage device in the second set of storage devices.

15. The method of claim 14, further comprising:
determining a score of the given storage device based on at least any one of an access load of the given storage device and a wear degree of the given storage device, as well as the stripe correlation; and
selecting the destination storage device based on the score of the given storage device.

16. The method of claim 13, wherein selecting the destination storage device from the first set of storage devices based on the determined stripe correlation comprises:
selecting the destination storage device based on a determination that a stripe correlation of the destination storage device in the first set of storage devices is lower than a stripe correlation of another storage device in the first set of storage devices.

17. The method of claim 13, wherein selecting the destination storage device from the first set of storage devices based on the determined stripe correlation further comprises:
selecting the destination storage device based on the stripe correlation and a device correlation of the destination storage device.

18. The method of claim 1, further comprising: moving the data in the source extent to the idle extent in the destination storage device based on a determination that a balance index of the source storage device is higher than a balance index of the destination storage device.

19. An electronic device, comprising:
at least one processor; and
a memory coupled to the at least one processor and having instructions stored therein, wherein the instructions, when executed by the at least one processor, cause the device to perform a method of:
determining a balance index of a storage device in a plurality of storage devices, respectively, the balance index indicating a relationship between distribution of a set of stripes involved by the storage device and distribution of a set of stripes involved by the plurality of storage devices,
selecting a source storage device from the plurality of storage devices according to the determined balance indexes,
selecting a source extent from a set of extents that have been allocated in the source storage device, and
moving data in the source extent to an idle extent in a destination storage device in the plurality of storage devices.

20. A computer program product having a non-transitory computer readable medium which stores a set of instructions to manage stripes in a storage system; the set of instructions, when carried out by computerized circuitry, causing the computerized circuitry to perform a method of:
determining a balance index of a storage device for each storage device in a plurality of storage devices in the storage system, the balance index indicating a relationship between distribution of a set of stripes involved by that storage device and distribution of a set of stripes involved by the plurality of storage devices;
selecting a source storage device from the plurality of storage devices according to the determined balance indexes;
selecting a source extent from a set of extents that have been allocated in the source storage device; and
moving data in the source extent to an idle extent in a destination storage device in the plurality of storage devices.

* * * * *